United States Patent
Hiramatsu

(10) Patent No.: US 8,984,623 B2
(45) Date of Patent: Mar. 17, 2015

(54) IMAGE PROCESSING SYSTEM, IMAGE PROCESSING APPARATUS AND COMPUTER-READABLE RECORDING MEDIUM

(75) Inventor: Naoko Hiramatsu, Kyoto (JP)

(73) Assignee: Konica Minolta Businesstechnologies, Inc., Chiyoda-ku, Tokyo (JP)

( * ) Notice: Subject to any disclaimer, the term of this patent is extended or adjusted under 35 U.S.C. 154(b) by 132 days.

(21) Appl. No.: 13/467,786

(22) Filed: May 9, 2012

(65) Prior Publication Data

US 2012/0291118 A1 Nov. 15, 2012

(30) Foreign Application Priority Data

May 11, 2011 (JP) .................................. 2011-106035

(51) Int. Cl.
*G06F 7/04* (2006.01)
*G06F 21/00* (2013.01)
*H04N 1/00* (2006.01)
*G06F 21/60* (2013.01)

(52) U.S. Cl.
CPC ............... *G06F 21/00* (2013.01); *H04N 1/00* (2013.01); *H04N 1/00923* (2013.01); *G06F 21/608* (2013.01); *G06F 2221/2113* (2013.01)
USPC ............................................................ 726/16

(58) Field of Classification Search
CPC ................................. G06F 21/31; G06F 21/83
USPC ............................................................. 726/16, 2
See application file for complete search history.

(56) References Cited

U.S. PATENT DOCUMENTS

| | | | |
|---|---|---|---|
| 7,765,595 B2* | 7/2010 | Focke et al. ..................... | 726/22 |
| 2006/0242711 A1 | 10/2006 | Anzai et al. | |
| 2008/0007770 A1 | 1/2008 | Tokunaga | |
| 2008/0052722 A1 | 2/2008 | Tokunaga | |
| 2008/0059962 A1 | 3/2008 | Ito | |
| 2011/0041130 A1 | 2/2011 | Isaka | |
| 2011/0110650 A1* | 5/2011 | Xie .............................. | 386/353 |

FOREIGN PATENT DOCUMENTS

| | | |
|---|---|---|
| CN | 101090441 A | 12/2007 |
| CN | 101132463 A | 2/2008 |
| JP | 2000-194591 A | 7/2000 |
| JP | 2005-204242 A | 7/2005 |
| JP | 20060331383 | 12/2006 |
| JP | 20110039921 | 2/2011 |

OTHER PUBLICATIONS

Japanese Office Action (Notice of Reasons for Refusal) dated May 28, 2013, issued by the Japanese Patent Office in corresponding Japanese Patent Application No. 2011-106035, and an English Translation of the Japanese Office Action. (9 pgs.).
The First Office Action and Search Report (First Notice of the Opinion on Examination) issued on May 6, 2014, by the State Intellectual Property Office of the People's Republic of China in corresponding Chinese Patent Application No. 201210146703.6, and an English Translation of the Office Action. (29 pages).

* cited by examiner

*Primary Examiner* — Anthony Brown
(74) *Attorney, Agent, or Firm* — Buchanan Ingersoll & Rooney PC

(57) ABSTRACT

An image processing apparatus capable of executing a task including a plurality of processes includes the following units: an acquisition unit that acquires the security levels of the plurality of processes based on security-level information that defines the security level of each process; a specification unit that specifies a lowest-level process that is a process having a lowest security level, from among the plurality of processes; and a notification unit that notifies a user of information regarding the lowest-level process.

23 Claims, 24 Drawing Sheets

| PROCESS NAME | PROCESS TYPE | URL ETC. | SECURITY LEVEL | INPUT FORMAT | OUTPUT FORMAT | PROCESSING TIME | PRICE |
|---|---|---|---|---|---|---|---|
| SERVER STORAGE PROCESS PV1 | SERVER STORAGE | webstrage.co.jp | LV3 | --- | --- | 10 | 20 |
| OCR PROCESS PR1 | OCR | APPARATUS INTERIOR | LV4 | JPEG | PDF | 10 | 10 |
| J-TO-E TRANSLATION PROCESS PT1 | J-TO-E TRANSLATION | etrans.co.jp | LV2 | PDF | PDF | 20 | 20 |
| J-TO-E TRANSLATION PROCESS PT2 | J-TO-E TRANSLATION | transeng.co.jp | LV3 | PDF | PDF | 40 | 50 |
| SCANNING PROCESS PN1 | SCAN | APPARATUS INTERIOR | LV5 | --- | JPEG | 10 | 10 |
| J-TO-E TRANSLATION PROCESS PT3 | J-TO-E TRANSLATION | ejtrans.co.jp | LV3 | TXT | TXT | 20 | 60 |
| TEXT SEPARATION PROCESS PX1 | TEXT SEPARATION | APPARATUS INTERIOR | LV4 | PDF | TXT&PDF | 5 | 5 |
| TEXT COMBINING PROCESS PM1 | TEXT COMBINING | APPARATUS INTERIOR | LV4 | TXT&PDF | PDF | 5 | 5 |
| OCR PROCESS PR2 | OCR | makepdf.co.jp | LV3 | JPEG | PDF | 5 | 20 |
| J-TO-E TRANSLATION PROCESS PT4 | J-TO-E TRANSLATION | translate.co.jp | LV4 | PDF | PDF | 15 | 50 |
| J-TO-E TRANSLATION PROCESS PT5 | J-TO-E TRANSLATION | bridge.co.jp | LV3 | PDF | PDF | 60 | 30 |

| TASK SEQUENCE | PROCESS NAME | PROCESS TYPE | URL ETC. | SECURITY LEVEL |
|---|---|---|---|---|
| 1 | SCANNING PROCESS PN1 | SCAN | APPARATUS INTERIOR | LV5 |
| 2 | OCR PROCESS PR1 | OCR | APPARATUS INTERIOR | LV4 |
| 3 | J-TO-E TRANSLATION PROCESS PT1 | J-TO-E TRANSLATION | etrans.co.jp | LV2 |
| 4 | SERVER STORAGE PROCESS PV1 | SERVER STORAGE | webstrage.co.jp | LV3 |

...

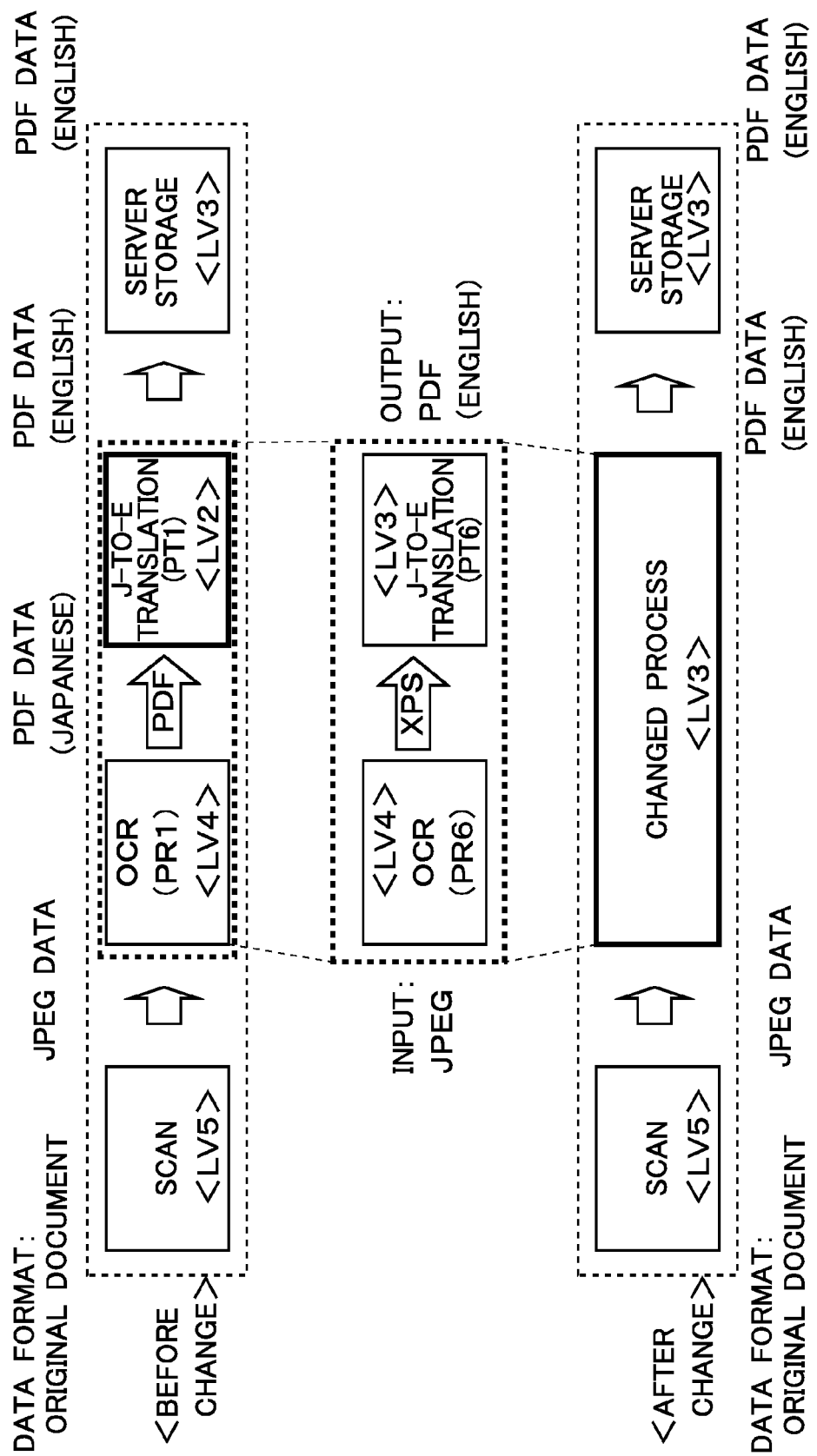

US 8,984,623 B2

IMAGE PROCESSING SYSTEM, IMAGE PROCESSING APPARATUS AND COMPUTER-READABLE RECORDING MEDIUM

This application is based on Japanese Patent Application No. 2011-106035 filed on May 11, 2011, the contents of which are hereby incorporated by reference.

BACKGROUND OF THE INVENTION

1. Technical Field

The present invention relates to image processing apparatuses such as Multi-Functional Peripherals (MFPs) and technology related thereto.

2. Related Art

There is security technology for ensuring security of data when executing processing (see JP 2000-194591A, for example). For instance, in the technique disclosed in JP2000-194591A, when a process is to be executed, the authority level of a person who is to execute the process and the security level of the process are compared with each other, and if the "authority level" is lower than the "security level", execution of the process is not permitted.

Incidentally, image processing apparatuses having a web access function have been proposed in recent years with advances in network technology or the like. Also, various services (such as translation services) are provided on the web.

Following this, it is envisaged that such services are used in the aforementioned image processing apparatuses. Furthermore, a situation can be considered in which in the aforementioned image processing apparatuses, a plurality of processes (jobs) are executed in combination while involving the use of various services that involve communication with external devices or the like.

For example, a case is considered in which a scanning process for generating scan data of an original document, and a data-format conversion process (PDF conversion job) involving data-format conversion services (e.g., PDF conversion services) that involves character recognition processing and in which the scan data of the original document is converted into a predetermined format (e.g., PDF format) are executed sequentially. Furthermore, a case is also considered in which a translation process that involves translation services (e.g., Japanese to English translation services) in which sentence data within data in a predetermined format (e.g., PDF data) is translated is additionally executed.

However, if the prior art such as that described above is simply applied to such a case, the security of each process (job) is determined immediately before execution of the process. Thus, a user can know whether or not each process can be executed, just immediately before execution of the process. In this case, there is the problem that, in particular if there is a security problem with the second or a subsequent process to be executed among a plurality of processes, a user can know the fact that the process cannot be executed due to the security problem just immediately before execution of that process, and therefore, the time or the like that has been taken to execute the previous process/processes is/are wasted.

To be more specific, for example if an apparatus (e.g., MFP) is set such that processes (a series of processes) are automatically performed in succession, a user will know whether or not each process can be executed, in the middle of the series of processes (immediately before each process). For this reason, problems such as described above arise. Note that if a user is not present in front of the apparatus, the user will not notice interruptions of processes. Therefore, the user is required to stay in front of the apparatus (e.g., MFP) during the period from the start to the end of the series of processes and check the progress of operations.

SUMMARY OF THE INVENTION

It is an object of the present invention to provide an image processing apparatus capable of ensuring security more appropriately when executing a plurality of processes, and a technique related thereto.

According to a first aspect of the present invention, an image processing apparatus capable of executing a task including a plurality of processes, includes an acquisition unit that acquires security levels of the plurality of processes based on security-level information that defines a security level of each process, a specification unit that specifies a lowest-level process that is a process having a lowest security level, from among the plurality of processes, and a notification unit that notifies a user of information regarding the lowest-level process.

According to a second aspect of the present invention, an image processing system capable of executing a task including a plurality of processes, includes an acquisition unit that acquires security levels of the plurality of processes based on security-level information that defines a security level of each process, a specification unit that specifies a lowest-level process that is a process having a lowest security level, from among the plurality of processes, and a notification unit that notifies a user of information regarding the lowest-level process.

According to a third aspect of the present invention, a non-transitory computer-readable recording medium stores a program for causing a computer to execute the steps of a) acquiring security levels of a plurality of processes that constitute a predetermined task, based on security-level information that defines a security level of each process, b) specifying a lowest-level process that is a process having a lowest security level, from among the plurality of processes, and c) notifying a user of information regarding the lowest-level process.

According to a fourth aspect of the present invention, an image processing apparatus capable of executing a task including a plurality of processes, includes an acquisition unit that acquires security levels of the plurality of processes based on security-level information that defines a security level of each process, a specification unit that specifies a low-security-level process that is a process having a security level lower than a reference level of a document targeted for the task, from among the plurality of processes, and a notification unit that notifies a user of information regarding the low-security-level process.

According to a fifth aspect of the present invention, an image processing system capable of executing a task including a plurality of processes, includes an acquisition unit that acquires security levels of the plurality of processes based on security-level information that defines a security level of each process, a specification unit that specifies a low-security-level process that is a process having a security level lower than a reference level of a document targeted for the task, from among the plurality of processes, and a notification unit that notifies a user of information regarding the low-security-level process.

According to a sixth aspect of the present invention, a non-transitory computer-readable recording medium stores a program for causing a computer to execute the steps of a) acquiring security levels of a plurality of processes that constitute a predetermined task, based on security-level information that defines a security level of each process, b) specifying a low-security-level process that is a process having a security level lower than a reference level of a document targeted for the task, from among the plurality of processes, and c) notifying a user of information regarding the low-security-level process.

These and other objects, features, aspects and advantages of the present invention will become more apparent from the following detailed description of the present invention when taken in conjunction with the accompanying drawings.

BRIEF DESCRIPTION OF THE DRAWINGS

FIG. 9 shows service list data.
FIG. 10 shows registered task data.
FIG. 11 is a flowchart showing a confirmation operation and the like.
FIG. 24 is a conceptual diagram illustrating how processes are changed according to another modification.

DETAILED DESCRIPTION OF THE PREFERRED EMBODIMENTS

Hereinafter, embodiments of the present invention will be described with reference to the drawings.

1. First Embodiment 1-1. Overview of Configuration

Figure 1:
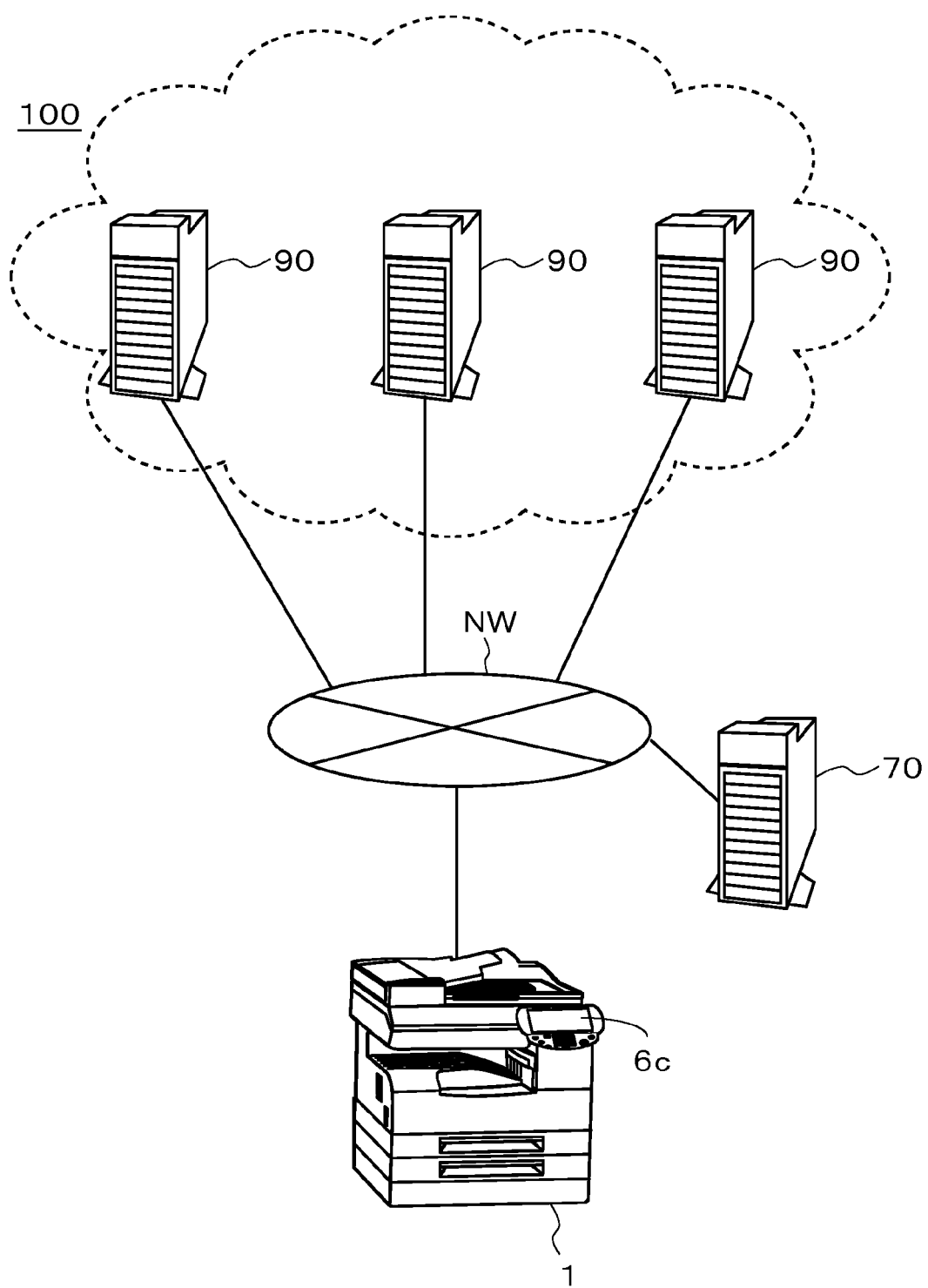
FIG. 1 is a schematic diagram showing a configuration of an image processing system.

FIG. 1 is a schematic diagram showing a configuration of an image processing system 100. This image processing system 100 includes a plurality of Multi-Functional Peripherals (also referred to simply as the "MFPs") 1 and a plurality of server computers (also referred to simply as the "servers") 90 and 70. For example, the server 90 is an external server and the server 70 is an in-house server. Note that for the convenience of illustration, a single MFP 1, a single server 70, and a plurality of servers 90 are shown in FIG. 1.

The MFP 1 and the servers 90 and 70 are connected to one another via a network NW so as to be capable of transmitting/receiving data among them via the network NW. Examples of the network NW include various types of networks such as a local area network (LAN), a wide area network (WAN), and the Internet. For example, the MFP 1 and the server 70 are communicably connected to each other within the same LAN, and the MFP 1 and the servers 90 are communicably connected to one another via the Internet.

The MFP 1 is an apparatus (also referred to as a "Multi-Functional Peripheral") that has a scanner function, a printer function, a copy function, a facsimile communication function, and the like. The MFP 1 is also referred to as an image processing apparatus, an image forming apparatus, or the like. The image processing system 100 is also referred to as an image forming system or the like.

Figure 2:
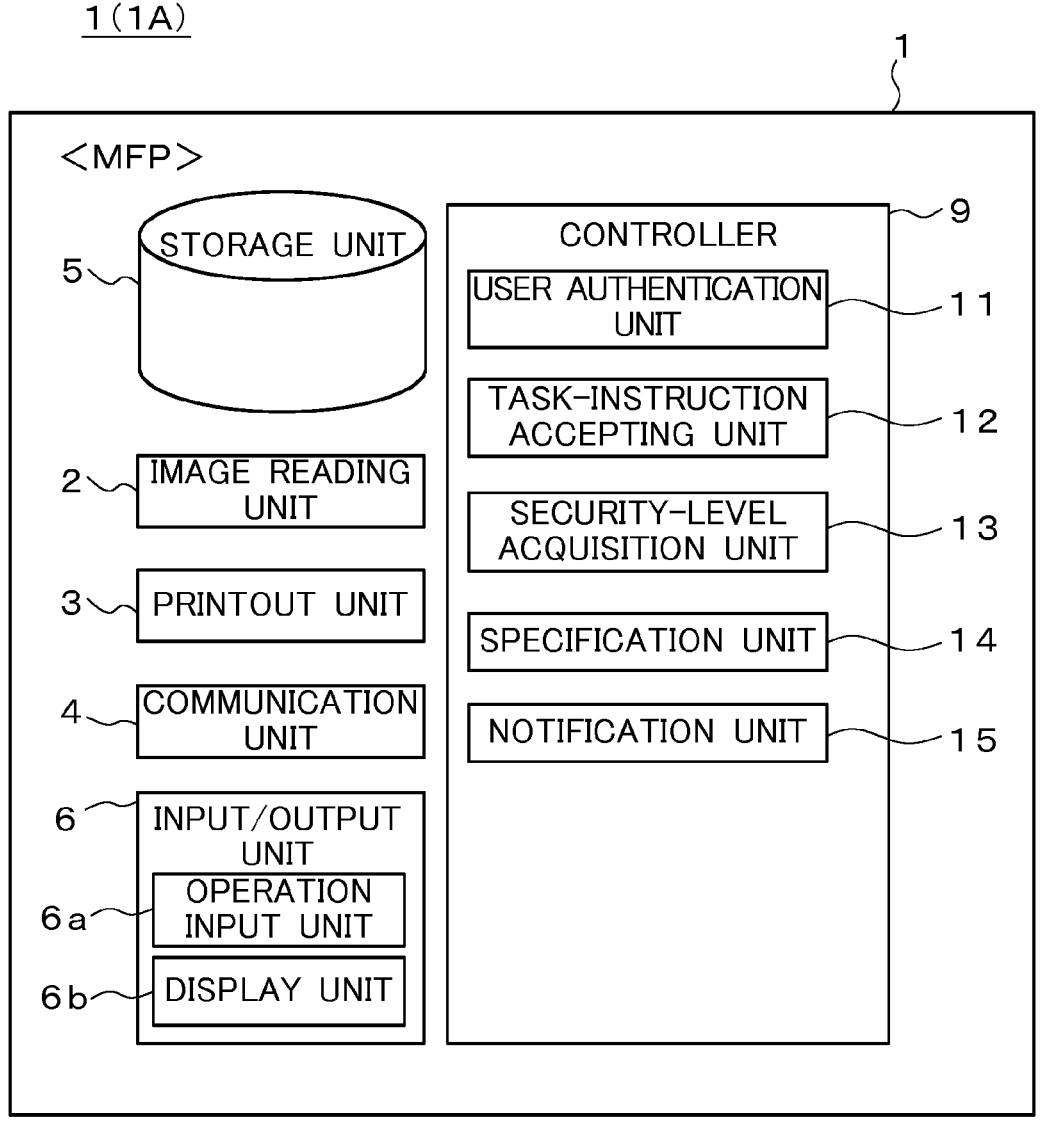
FIG. 2 is a functional block diagram of an MFP.

As shown in a functional block diagram in FIG. 2, the MFP 1 includes, for example, an image reading unit 2, a printout unit 3, a communication unit 4, a storage unit 5, an input/output unit 6, and a controller 9, and realizes various functions by operating these units in a complex manner.

The image reading unit 2 is a processing unit that optically reads an original document placed at a predetermined position on the MFP 1 and generates (forms) image data of the original document (also referred to as a "document image").

The printout unit 3 is an output unit that prints out (forms) an image on various types of media such as paper, based on the image data of the original document.

The communication unit 4 is a processing unit capable of facsimile communication via a public network or the like. The communication unit 4 is also capable of network communication via the communication network NW. Various types of protocols such as TCP/IP (Transmission Control Protocol/Internet Protocol) and FTP (File Transfer Protocol) are used in this network communication. Using the network communication enables the MFP 1 to exchange various types of data with the desired party.

The storage unit 5 is configured from a storage device such as a hard disk drive (HDD) or a nonvolatile memory. A document image (image data) or the like generated by the image reading unit 2 or the like is stored in the storage unit 5.

The input/output unit 6 includes an operation input unit 6a that accepts input to the MFP 1, and a display unit 6b that displays and outputs various types of information. Specifically, the MFP 1 is provided with hard keys, a touch screen 6c, and the like.

The hard keys function as part of the operation input unit 6a. The touch screen 6c is configured by embedding piezoelectric sensors or the like in a liquid crystal display panel, and functions as part of the display unit 6b and also as part of the operation input unit 6a. Specifically, the touch screen 6c can display various types of information on the liquid crystal display panel, and can also accept various types of input by detecting operational positions of fingers of an operator on the liquid crystal display panel. For example, when a virtual button displayed on the touch screen 6c is touched with a finger of the operator, this operation is taken as an operation of pressing the button.

In this way, the input/output unit 6 is capable of displaying appropriate information to an operator (e.g., a user) and is also capable of accepting input operations by the operator (e.g., an operating for making various settings using a menu screen).

The controller 9 is a control device that performs overall control of the MFP 1, and is configured from a CPU and various types of semiconductor memories (such as a RAM and a ROM). The controller 9 can also be expressed as a built-in computer within the MFP 1. Various functions of the MFP 1 are realized by the various processing units operating under the control of the controller 9. The controller 9 realizes various processing units by causing a CPU to execute a predetermined software program (hereinafter, also referred to simply as the "program") PG stored in a ROM (e.g., EEPROM). Note that the program PG may be downloaded via the network NW and installed in the MFP 1. Alternatively, the program PG may be recorded in various types of non-transitory (or portable) recording media (such as a USB memory) and installed in the MFP 1 by reading out the program from the recording media.

To be more specific, the controller 9 realizes various processing units including a user authentication unit 11, a task-instruction accepting unit 12, a security-level acquisition unit 13, a specification unit 14, and a notification unit 15.

The user authentication unit 11 is a processing unit that performs user authentication processing.

The task-instruction accepting unit 12 is a processing unit that accepts an instruction (user instruction) to execute a task including a plurality of processes (a series of processes). The task-instruction accepting unit 12 accepts the user instruction to execute the task, by cooperating with the input/output unit 6.

The security-level acquisition unit 13 is a processing unit that acquires the security levels of a plurality of processes. The security-level acquisition unit 13 acquires the security levels of the plurality of processes based on security-level information (e.g., service list data DS described later) that defines the security levels of processes including the plurality of processes.

The specification unit 14 is a processing unit that specifies a "lowest-level process" that is a process having a lowest security level, from among a plurality of processes included in a task.

The notification unit 15 is a processing unit that notifies a user of information regarding the lowest-level process.

Operations or the like of these processing units will be described later in detail.

1-2. Operation

The MFP 1 is capable of executing various processes (also referred to as "jobs"). Examples of these processes include processes that are to be executed by the MFP 1 alone (e.g., a copying process and a scanning process). Examples of these processes also include processes (e.g., web service processes) that are to be executed using services (also referred to as external services) provided by an apparatus outside the MFP 1 (e.g., external servers 90) via a communication network or the like. Examples of the external services include data-format conversion services (also referred to as "PDF conversion services" or "optical character recognition (OCR) services") that involves character recognition processing (e.g., OCR processing) and in which scan data of an original document is converted into a predetermined format (e.g., PDF). Examples of the external services also include translation services (e.g., Japanese to English (J-to-E) translation services) in which sentence data within data in a predetermined format (e.g., PDF data) is translated, and server storage services in which data (file) is stored in a server.

Figure 3:
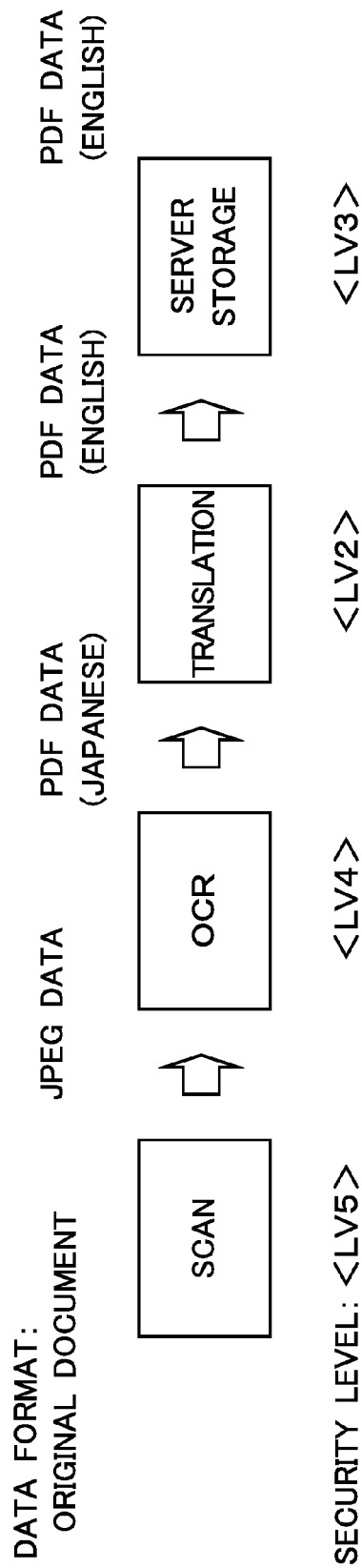
FIG. 3 shows a plurality of processes included in a task.

Here, a case in which a given task is executed by combining such plurality of processes (jobs) is given as an example. In other words, a case where image processing (image forming processing) that involves a task including a plurality of processes is executed is described. Specifically, a case as shown in FIG. 3 is considered in which four processes including a scanning process, an OCR process (character recognition process), a translation process, and a server storage process are executed in the order specified. Among these processes, the OCR process, the translation process, and the server storage process are, for example, processes that are to be executed using external services provided via the Internet. In this way, a plurality of external services are usable in at least part (part or all) of a plurality of processes that constitute a task.

When a user UA logs in to the MFP 1 through a user authentication operation performed by the user authentication unit 11, a base screen (also referred to as the "menu screen") GAO (not shown) is displayed on the touch screen 6c. Then, when a task registration button within the base screen GAO is pressed, then a screen GA10 for registering a task (FIG. 4) is displayed on the touch screen 6c.

A list LS of a plurality of available processes (jobs) is displayed in the lower section of the task registration screen GA10. In this list LS, some or all information pieces in the service list data DS (FIG. 9) is shown.

Figure 4:
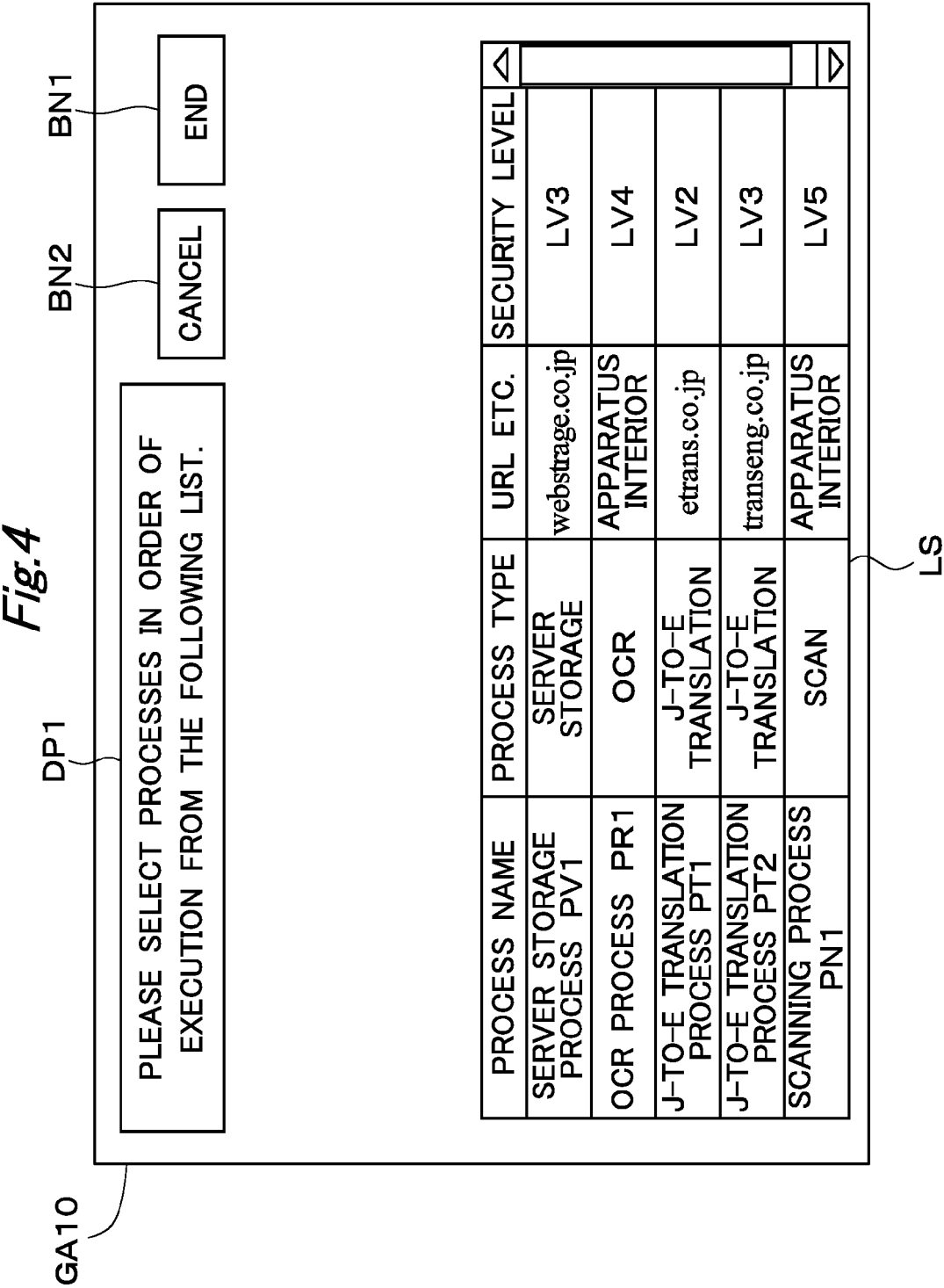
FIG. 4 shows a screen for registering a task.

For example, in FIG. 4, two J-to-E translation processes PT (specifically, a "J-to-E translation process PT1" and a "J-to-E translation process PT2"), a single OCR process PR ("OCR process PR1"), a single scanning process PN ("scanning process PN1"), a single server storage process PV ("server storage process PV1") and the like are shown as processes to be selected (selectable processes). Note that the J-to-E translation processes PT refer to the process of translation from Japanese to English. In the list LS, information of items such as "process name", "process type", "access destination address (e.g., URL)", and "security level" is recorded for each process.

"Process name" is information indicating the name of the process, and "process type" is information indicating the type of the process.

"Access destination address (e.g., URL)" is information indicating an access destination address to be used when executing the process. For a process to be executed outside the MFP 1, address information regarding a server to be accessed (e.g., the URL address of a web server 90) is recorded, and for a process to be executed inside the MFP 1, information indicating that the process is to be executed in the "apparatus interior" is recorded.

"Security level" is information indicating the security level of the process. For example, for a process using external services, a value indicating a predetermined level number (e.g., five-level number) based on the security level (safety evaluation value) or the like of each site (each server 90) that provides each external service (web service) is stored as the "security level". On the other hand, for an internal process, a value indicating a predetermined level number (e.g., five-level number) that indicates the security level or the like of the internal process is stored as the "security level".

The security level (level value) may be appropriately set by the manager of this system 100 or the like, based on the type of the process, the evaluation value given by a site evaluation organization, and the like. Note that, in general, relatively high level values (e.g., levels LV4 and LV5) are assigned to processes to be executed inside the apparatus (also referred to as the "internal processes"), and relatively low level values (e.g., levels LV2 and LV3) are assigned to processes to be executed outside the apparatus (also referred to as the "external processes") (in particular, external services or the like to be executed via a network outside the LAN).

For example, in FIG. 4, "level LV5" is assigned to the scanning process PN1, which is an internal process, and "level LV4" is assigned to the OCR process PR1, which is an external process. Also, "level LV3" is assigned to the server storage process PV1. Note that there are cases where different level values are assigned to a plurality of processes of the same type, based on the safety or the like of service provider sites thereof. In FIG. 4, "level LV2" is assigned to the J-to-E translation process PT1, and "level LV3" is assigned to the J-to-E translation process PT2.

Next, the user UA executes an operation for registering the content of a task to be performed on a given document (document targeted for the task). To be more specific, the user UA selects a plurality of processes in the sequence in which these processes are to be executed, from the list LS within the task registration screen GA10, and registers a task including the plurality of processes in the MFP 1. Here, a case where a plurality of processes as shown in FIG. 3 are sequentially registered is described. Information regarding the task is registered as task data DW, which will be described later.

Figure 5:
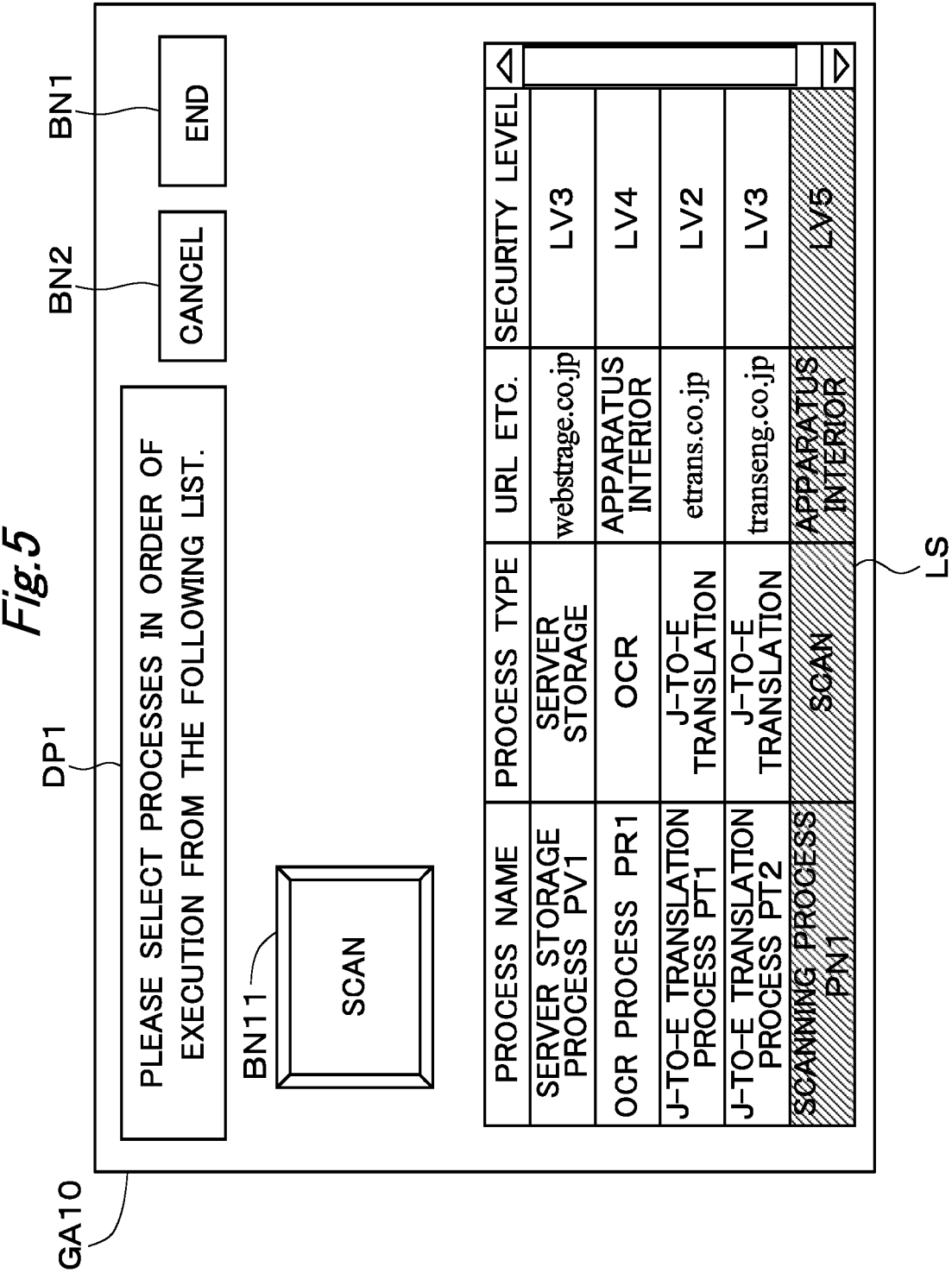
FIG. 5 shows a screen for registering a task.

First, the user UA selects the first process to be executed ("scanning process PN1") from the list LS within the task registration screen GA10. Specifically, the user SA presses, with a finger, a "scanning process PN1" portion in the fifth row of the list LS from the top within the touch screen 6c so as to select the "scanning process PN1". In response to this selection operation, the MFP 1 registers the "scanning process PN1" as the first process. Then, as shown in FIG. 5, the MFP 1 displays a "SCAN" button BN11 on the left edge in the middle section of the screen GA10 so as to indicate that the "scanning process" has been registered as the first process. Note that a re-setting operation can be performed by the press of the "SCAN" button BN11.

Figure 6:
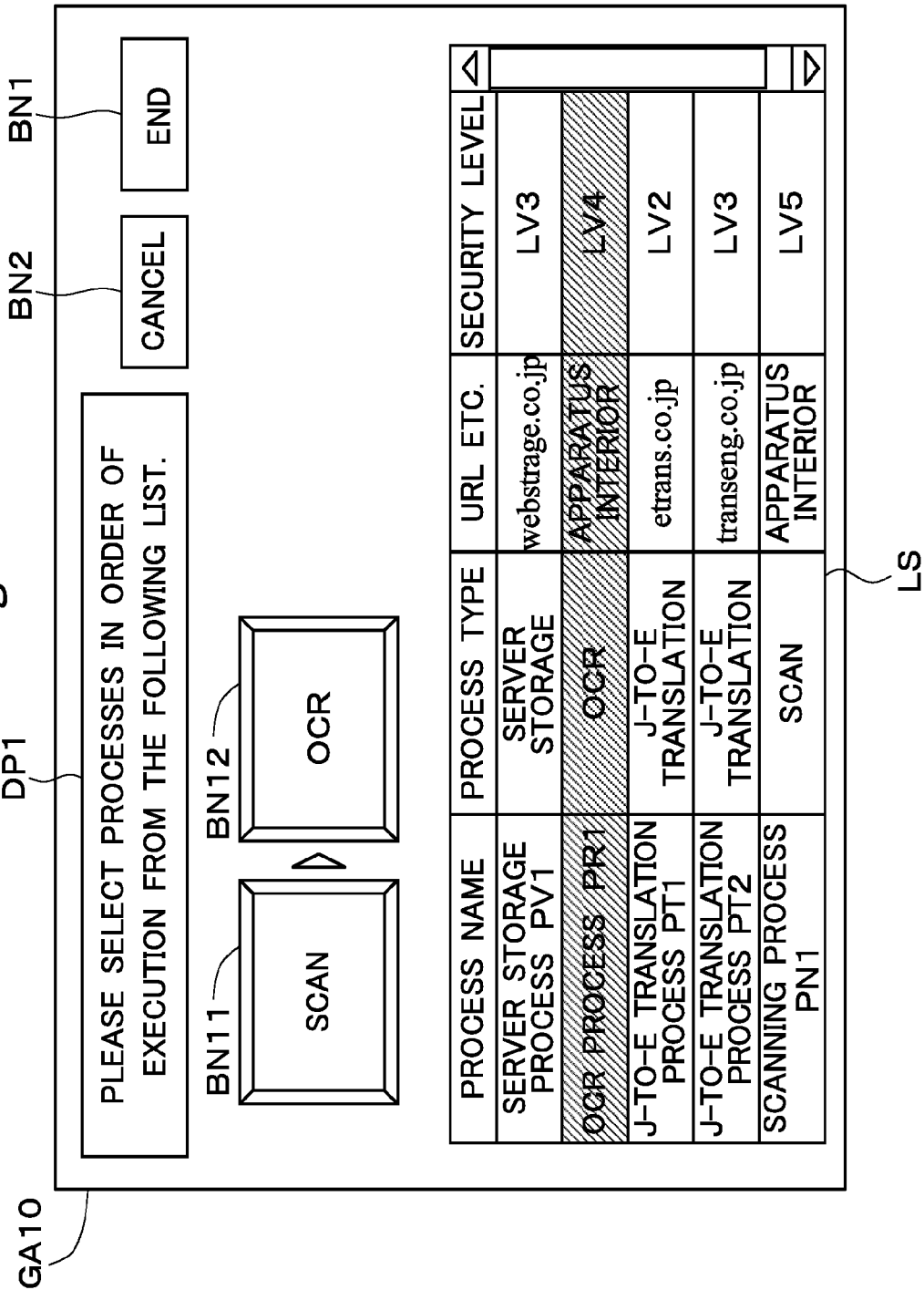
FIG. 6 shows a screen for registering a task.

Next, the user UA selects the second process to be executed ("OCR process PR1") from the list LS within the task registration screen GA10. Specifically, the user UA presses, with a finger, an "OCR process PR1" portion in the second row of the list LS from the top within the touch screen 6c so as to select the "OCR process PR1". In response to this selection operation, the MFP 1 registers the "OCR process PR1" as the second process. Then, as shown in FIG. 6, the MFP 1 displays an "OCR" button BN12 on the right side of the button BN11 (at the second position from the left) in the middle section of the screen GA10 so as to indicate that the "OCR process" has been registered as the second process. Note that a re-setting operation can be performed by the press of the OCR button BN12.

Figure 7:
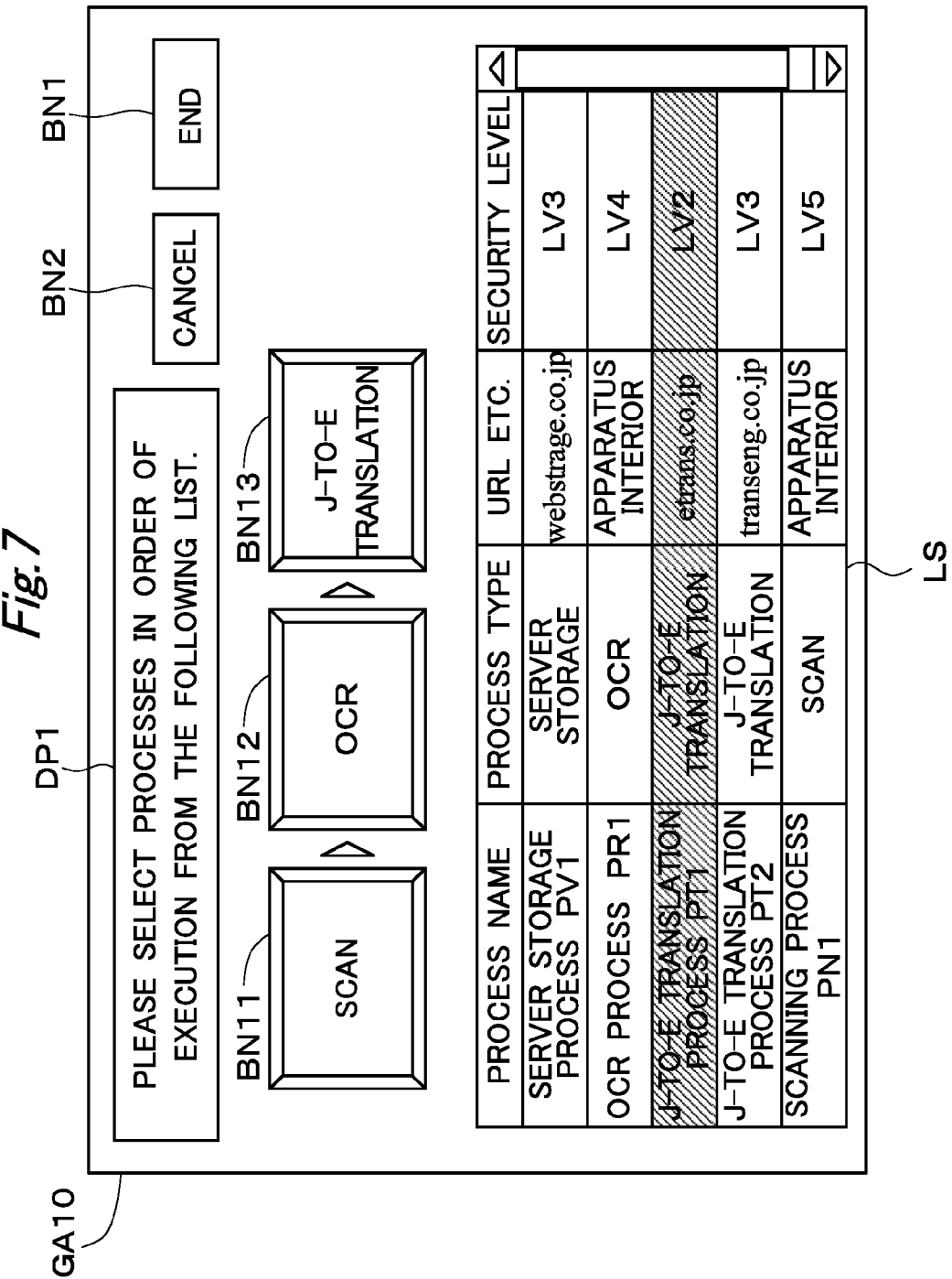
FIG. 7 shows a screen for registering a task.
Figure 8:
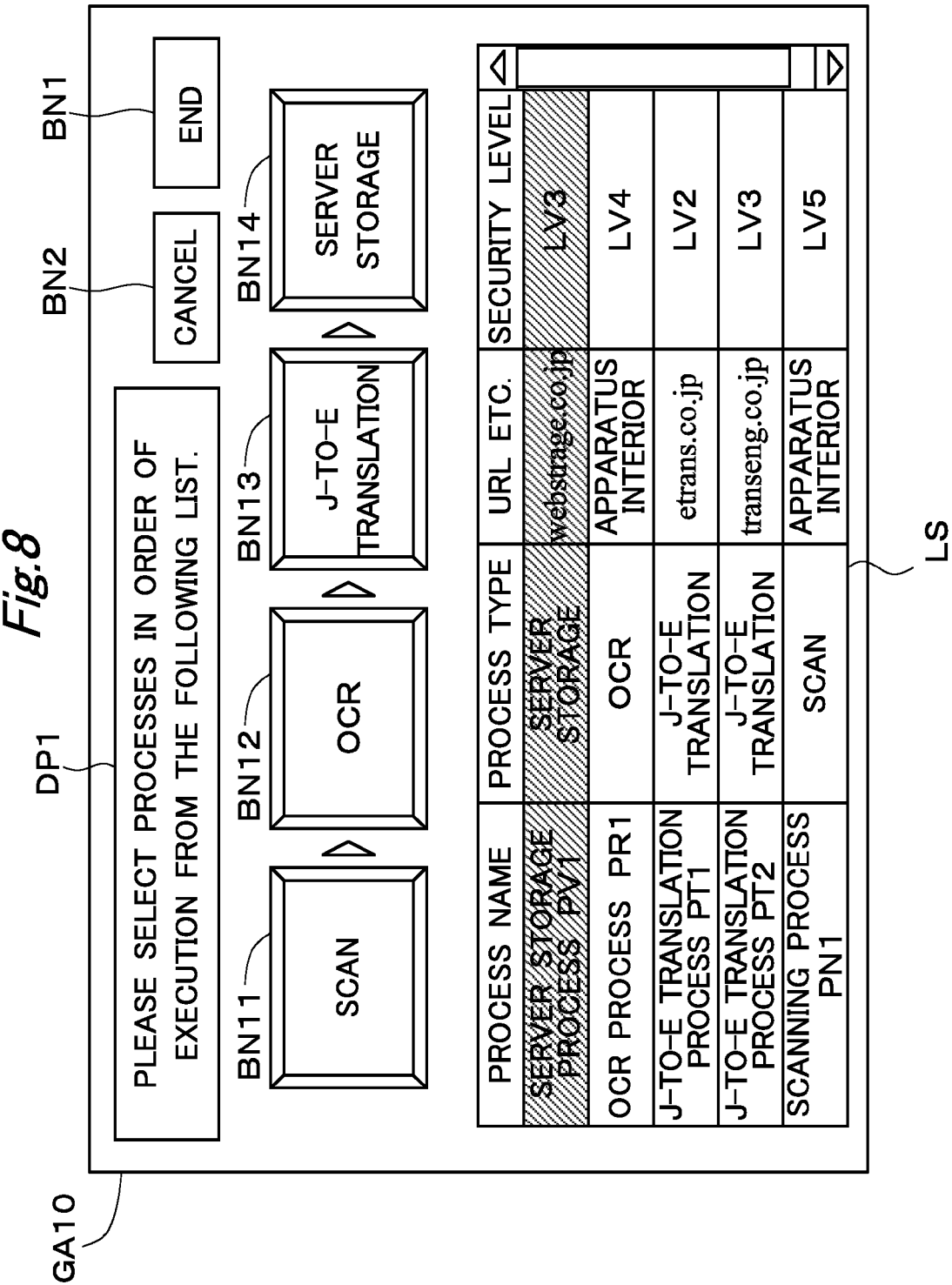
FIG. 8 shows a screen for registering a task.

Similarly, the user UA sequentially performs an operation for registering the third process to be executed ("J-to-E translation process PT1") and an operation for registering the fourth process to be executed ("server storage process PV1"). In response to these operations, the MFP 1 registers the "J-to-E translation process PT1" as the third process, and as shown in FIG. 7, displays a "J-to-E translation" button BN13 on the right side of the button BN12 (at the third position from the left) in the middle section of the screen GA10 so as to indicate that the "J-to-E translation process" has been registered as the third process. Furthermore, the MFP 1 registers the "server storage process PV1" as the fourth process, and as shown in FIG. 8, displays a "server storage" button BN14 on the right side of the button BN13 (at the fourth position from the left) in the middle section of the screen GA10 so as to indicate that the "server storage process" has been registered as the fourth process.

Thereafter, if an end button BN1 has been pressed, an operation for registering the task consisting of the four processes Pi ends. As a result, the task data DW as shown in FIG. 10 is registered. In the task data DW, information extracted from service list data DS (FIG. 9) (information regarding the processes Pi such as the process names, security levels, and the like of the processes Pi) is registered.

Figure 11:
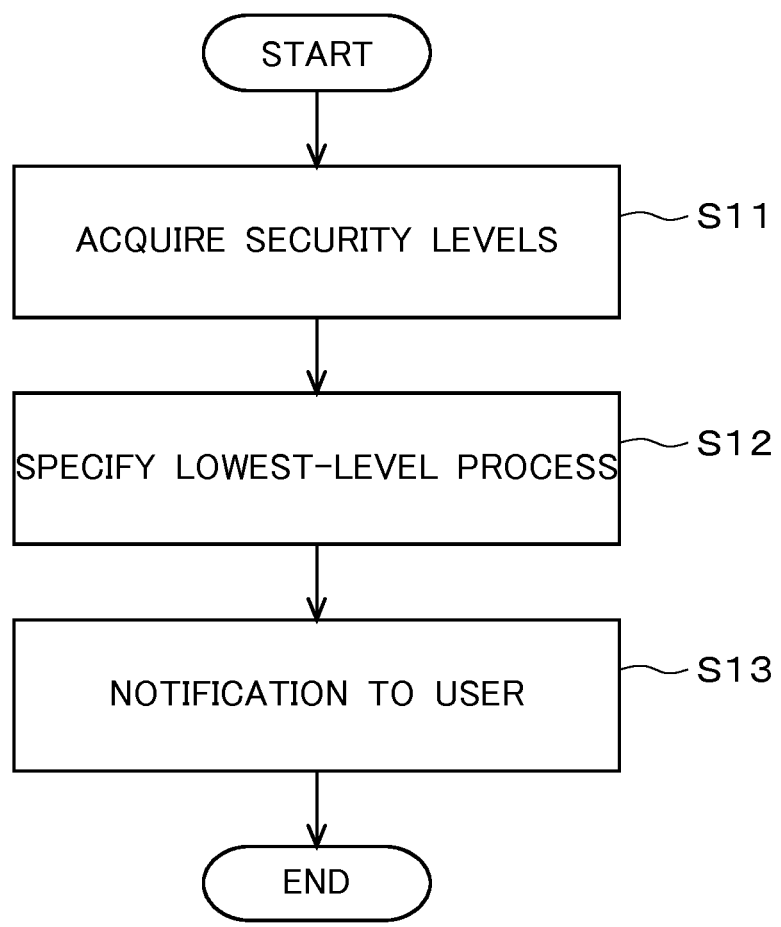

Furthermore, immediately after the user UA has completed these registration operations, the MFP 1 executes a confirmation operation or the like (see FIG. 11) described below. FIG. 11 is a flowchart showing the confirmation operation or the like.

First, in step S11, the security-level acquisition unit 13 specifies a plurality of processes Pi included in a task, based on registration information regarding the task (e.g., registered task data DW) and acquires the security levels of the plurality of processes Pi.

Specifically, the four processes Pi included in the task (the "scanning process PN1", the "OCR process PR1", the "J-to-E translation process PT1", and the "server storage process PV1") are specified based on the task data DW.

Furthermore, the security levels of these four processes Pi are acquired based on the task data DW (FIG. 10). The security-level acquisition unit 13 acquires information indicating that the security level of the scanning process PN1 is "level LV5" and the security level of the OCR process PR1 is "level LV4". The security-level acquisition unit 13 also acquires information indicating that the security level of the J-to-E translation process PT1 is "level LV2" and the security level of the server storage process PV1 is "level LV3".

Next, in step S12, the specification unit 14 of the MFP 1 specifies a process having a lowest security level (also referred to as the "lowest-level process") from among the plurality of processes Pi. Specifically, the "J-to-E translation process PT1" having the lowest security level ("level L2") among the four security levels Li ("level LV5", "level LV4", "level LV2", and "level LV3") of the above four processes Pi (PN1, PR1, PT1 and PV1) is specified as the "lowest-level process" (see also FIG. 3).

Then, in step S13, the notification unit 15 of the MFP 1 notifies the user UA of information regarding the "J-to-E translation process PT1", which is the lowest-level process, and prompts the user UA to make a confirmation.

Figure 12:
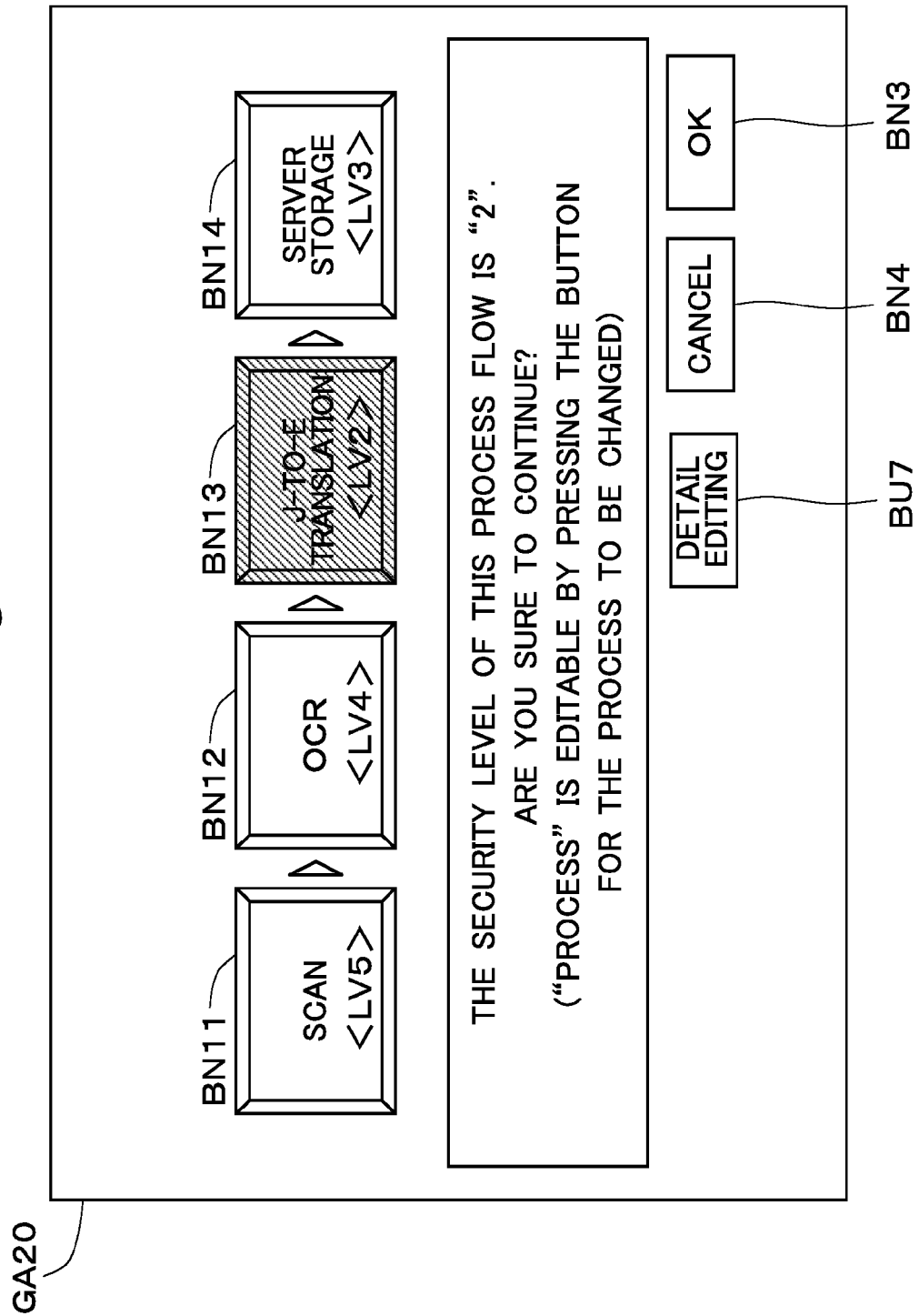
FIG. 12 shows a notification screen.

Specifically, the notification unit 15 displays a screen GA20 (FIG. 12) on the touch screen 6c. In the upper section of the screen GA20, a button BN13 corresponding to the third process (the J-to-E translation process PT1, which is the lowest-level process) is displayed in an emphasized manner differently from the other buttons (e.g., in a different color). In around the middle section of the screen GA20, a character string describing, for example, "The security level of this process flow is 2. Are you sure to continue?" is displayed. Such display is also expressed as warning display (or attention attracting display). Note that the screen GA20 is a screen for notifying information regarding the lowest-level process, and is also referred to as the "notification screen".

In this way, the fact that the security level of the "lowest-level process" in the task is LV2, or in other words, the security level of the entire task is LV2 is notified to the user UA. The user UA is also notified of the fact that the lowest-level process (in short, the process serving as a bottleneck) is the J-to-E translation process PT1.

Such a notification allows the user UA to confirm whether or not the security level of the entire task, i.e., LV2, satisfies a predetermined criterion (e.g., company criterion). For example, it is assumed that, according to company criteria, a relatively high reference value (in the range of levels LV3 to LV5, for example) is set as the security level required for confidential documents, and a relatively low reference value (e.g., level LV2) is set as the security level required for documents that can go public. The user UA is capable of comparing the security level required for a document targeted for the task and the security level of the registered task (the security level of the registered task as a whole), and then determining whether or not a predetermined criterion is satisfied.

If having determined that the security level (level LV2) of the registered task is higher than or equal to the security level (e.g., LV2) required for the document targeted for the task and a predetermined criterion is satisfied, the user UA presses an OK button BN3 and gives an instruction to execute the processes to the MFP 1. In response to the operation of pressing the OK button BN3, the MFP 1 executes the series of processes registered as described above.

Figure 13:
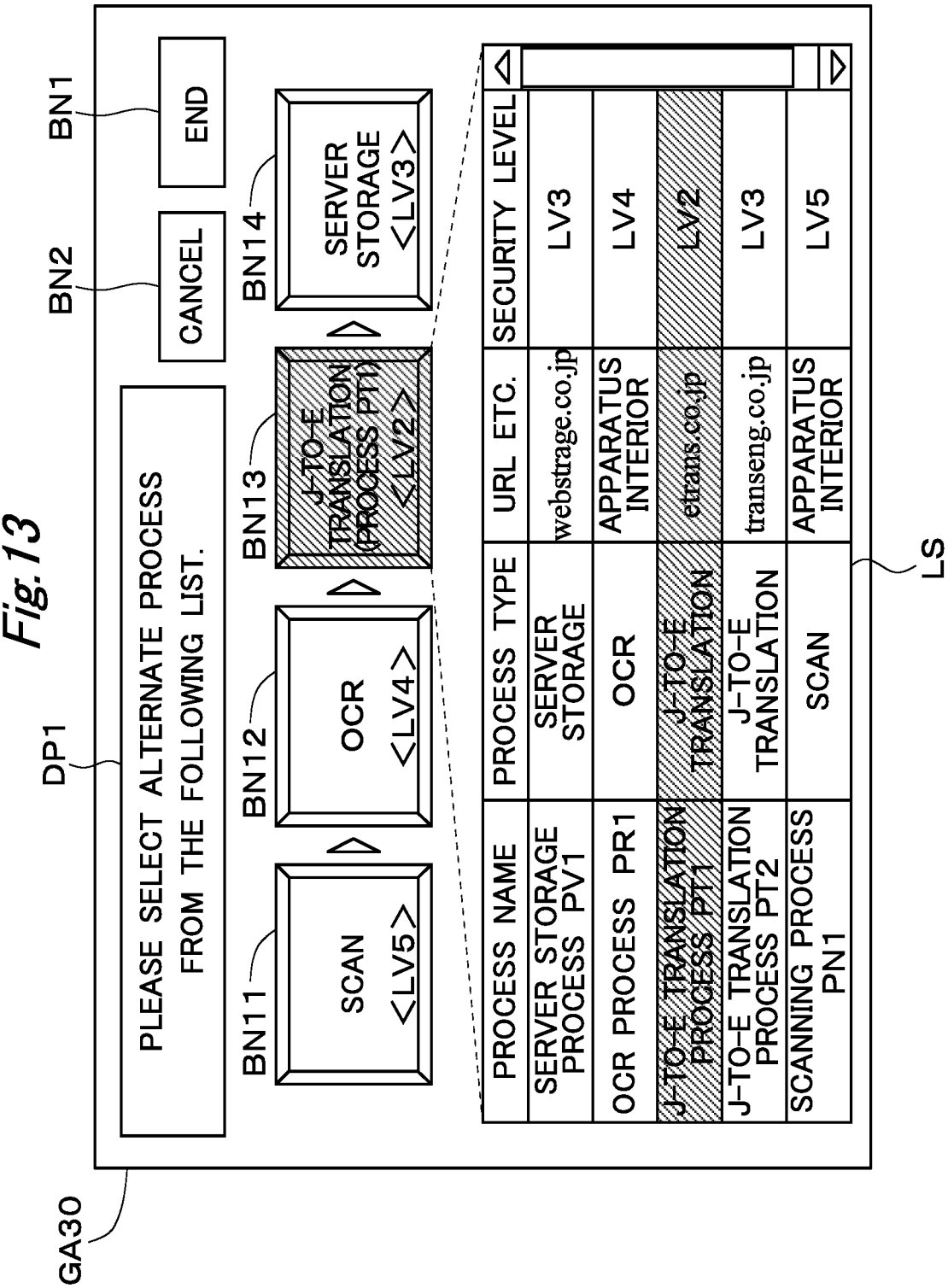
FIG. 13 shows an operation screen before a lowest-level process is changed.

On the other hand, if having determined that the security level (level LV2) of the registered task is lower than the security level required for the target document (e.g., LV3) and a predetermined criterion is not satisfied, the user UA executes an operation for editing processes (operation for changing processes). Specifically, the user UA presses a button (e.g., BN13) that corresponds to a process to be edited (e.g., the "J-to-E translation process PT1"). In response to the operation of pressing the button BN13, the MFP 1 displays a screen GA30 (see FIG. 13) similar to the screen GA10. The screen GA30 is a setting screen for selecting an alternate process that replaces the process to be edited ("J-to-E translation process PT1").

Figure 14:
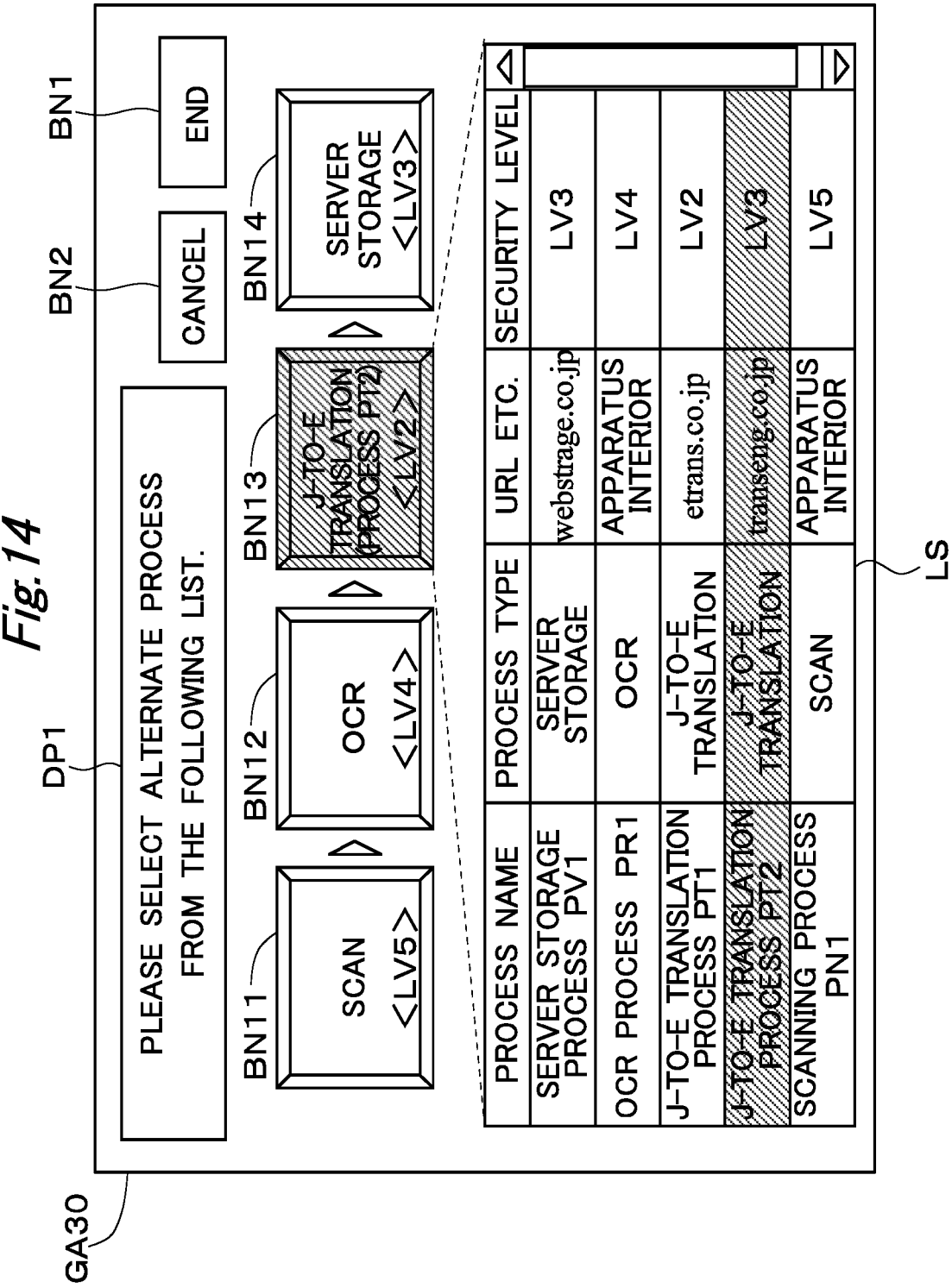
FIG. 14 shows an operation screen after the lowest-level process has been changed.

The user UA determines an alternate process by him/herself and presses, with a finger, a field of the list LS that corresponds to the determined alternate process (e.g., the "J-to-E translation process PT2") within the screen GA30 so as to select (designate) the alternate process. In response to this selection operation, the MFP 1 registers the "J-to-E translation process PT2" as the third process in the task data DW in place of the "J-to-E translation process PT1". Then, as shown in FIG. 14, the MFP 1 displays a button BN13 indicating the "J-to-E translation process PT2", which is the alternate process, at the third position from the left in the middle section of the screen GA30. This indicates that the third process has been changed, and to be more specific, the "J-to-E translation process PT2" has been registered as the third process.

Figure 15:
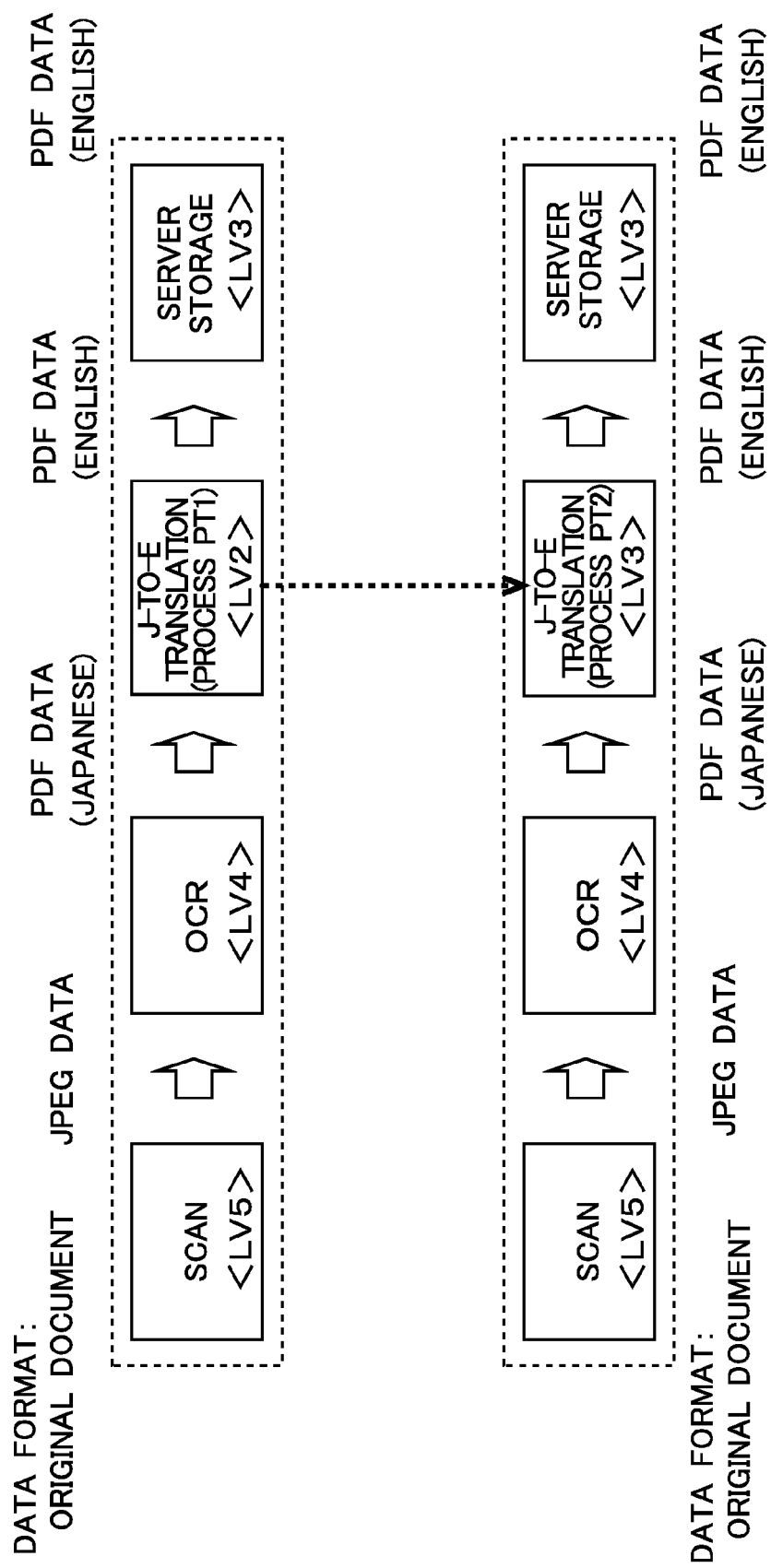
FIG. 15 is a conceptual diagram illustrating how the lowest-level process is changed.

Thereafter, when an END button BN1 is pressed, an operation for re-registering the task including the four processes (corrective registration operation) ends. As a result, the security level of the third process (here, the J-to-E translation process PT) increases from LV2 to LV3 as shown in FIG. 15.

Then, immediately after this re-registration operation, the confirmation operation or the like (see FIG. 11) as described above is executed again. Note that if there are a plurality of lowest-level processes, at least one of the plurality of lowest-level processes may be notified. Specifically, all of these lowest-level processes may be notified, or only one of these lowest-level processes may be notified.

Through the operation as described above, the "lowest-level process" in the task is specified, and information regarding the lowest-level process (e.g., information including process name and security level) is notified to a user. Therefore, the user can easily confirm whether or not the lowest-level process in the task satisfies a predetermined criterion. In particular, whether or not the security level is appropriate can be confirmed at a stage of the task registration operation, or in other words, at a stage before executing the lowest-level process (in short, at a relatively early stage). Accordingly, security can be ensured more appropriately when executing a plurality of processes.

Furthermore, the user UA can easily designate an alternate process because an input for designating an alternate process that replaces the lowest-level process is accepted by the press of the button BN13 within the notification screen GA20 or the like.

2. Second Embodiment

While the above-described first embodiment takes the example of the case where an alternate process is manually selected by a user, a second embodiment describes a case where an alternate process is automatically selected by the MFP 1. This second embodiment is a variation of the first embodiment. The following description focuses on differences from the first embodiment.

Figure 16:
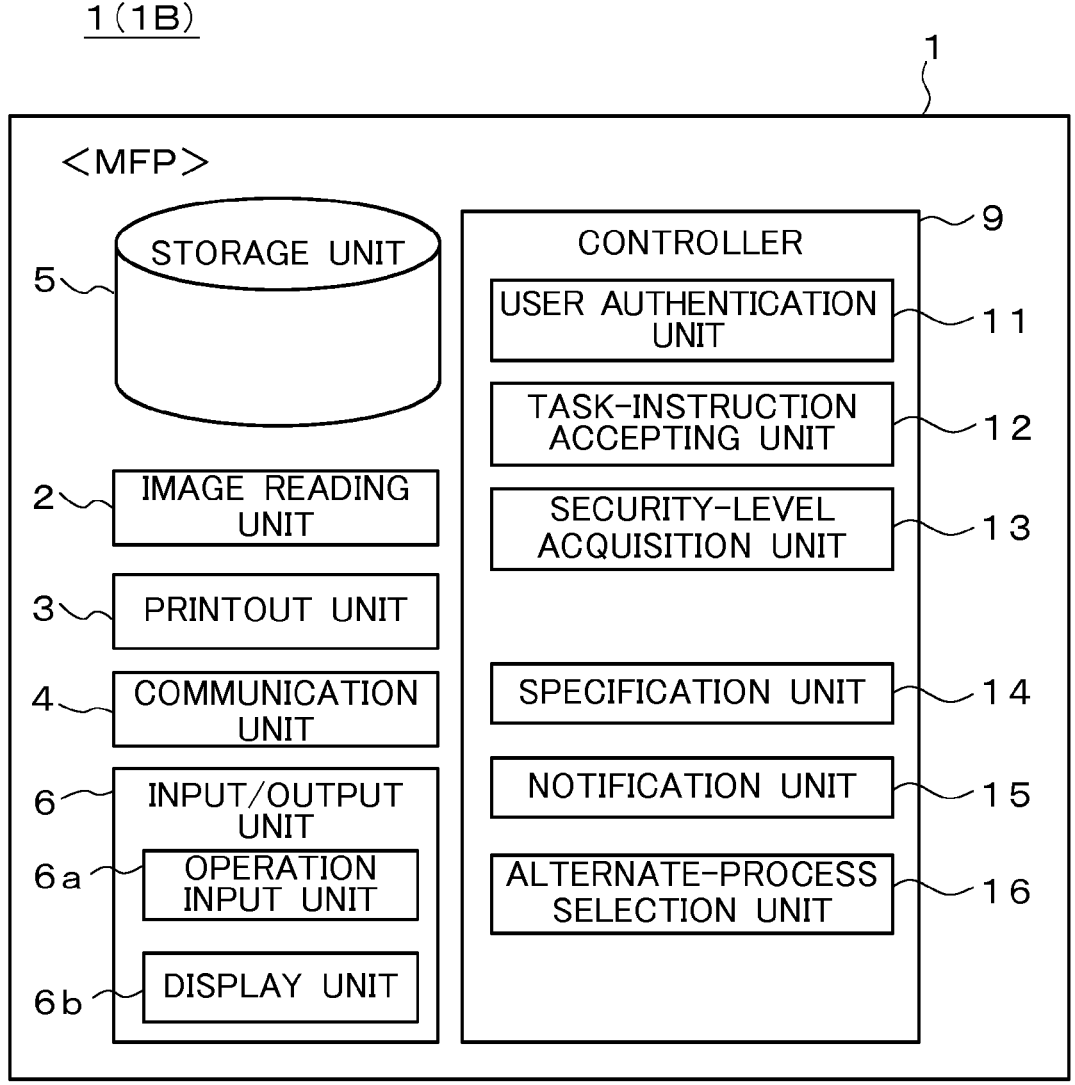
FIG. 16 is a functional block diagram of an MFP according to a second embodiment.

As shown in FIG. 16, an MFP 1 (also referred to as the "MFP 1B") according to the second embodiment further includes an alternate-process selection unit 16 in addition to the same configuration as the MFP 1A according to the first embodiment. The alternate-process selection unit 16 is a processing unit that selects an "alternate process" that is to be executed in place of a lowest-level process, based on security-level information (e.g., the service list data DS (FIG. 9)), and is realized by the controller 9 executing a program PG.

In the second embodiment, the same operation as in the first embodiment is executed. However, the operation in the second embodiment differs from that in the first embodiment in that, in the last step S13 in FIG. 11, not only the notification processing but also the processing for selecting an alternate process are executed automatically.

Figure 17:
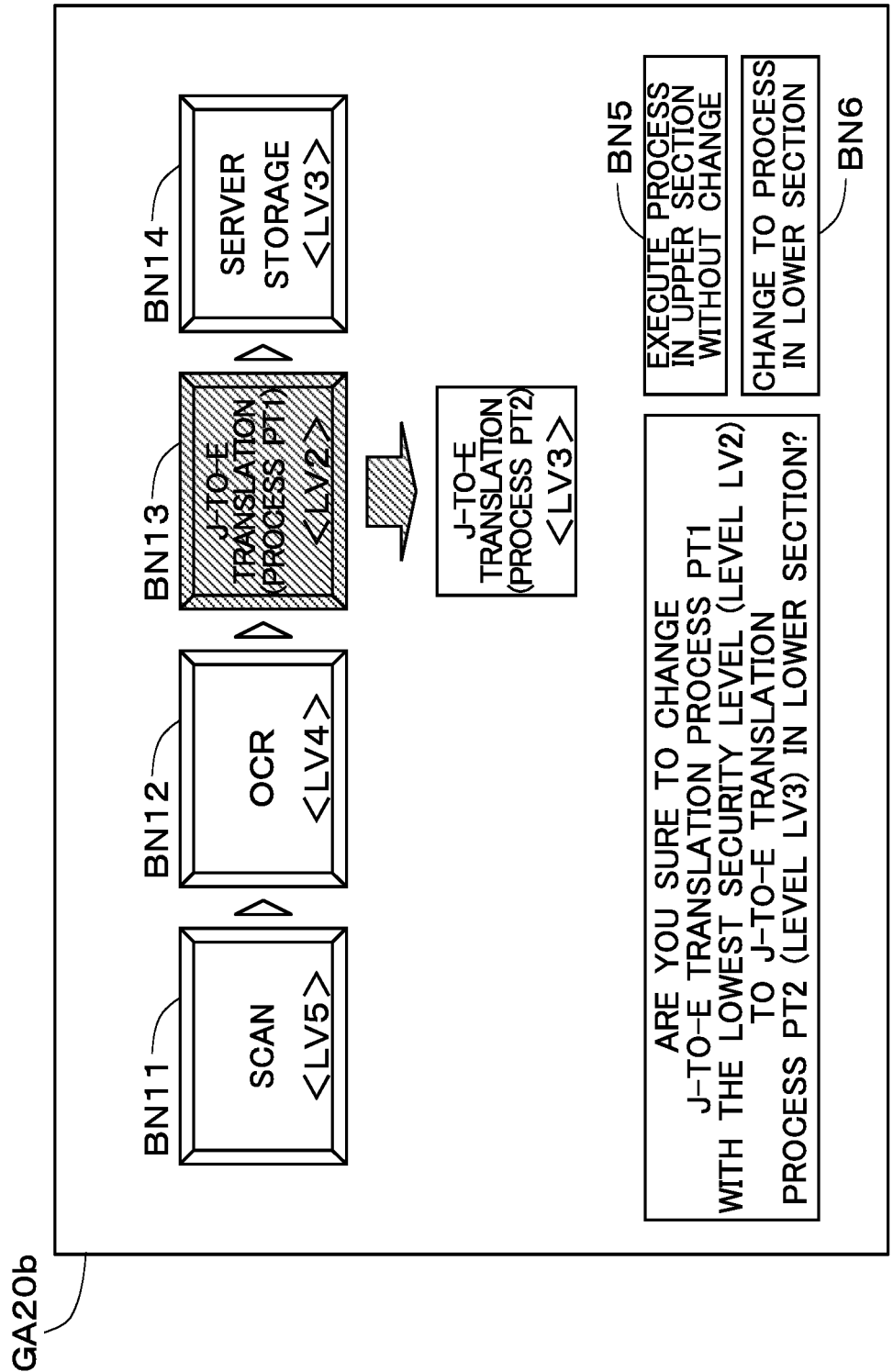
FIG. 17 shows a notification screen according to the second embodiment.

FIG. 17 shows a notification screen GA20b displayed in place of the notification screen GA20 (also referred to as the "notification screen GA20a") (FIG. 12) according to the first embodiment.

In the screen GA20b, as a candidate for the "alternate process" that replaces the J-to-E translation process PT1 (lowest-level process), the "J-to-E translation process PT2" is automatically selected and displayed by the MFP 1. Specifically, the alternate-process selection unit 16 of the MFP 1B selects, as the alternate process, a process that is of the same type as the J-to-E translation process PT1 (lowest-level process) and has a security level higher than the security level (LV2) of the lowest-level process, based on the service list data DS (FIG. 9). For example, the alternate-process selection unit 16 selects the "J-to-E translation process PT2" having a security level "level LV3" as an alternate process.

Furthermore, the alternate process is preferably selected on condition that the security level of this process be lower than or equal to the security level of a "highest-level process". As a result, it is possible to avoid selecting a process having a too high security level as an alternate process. Note that the "highest-level process" as used here refers to a process having a highest security level among the plurality of processes Pi included in the target task. In the present example, the "scanning process" having a security level LV5 is the "highest-level process".

Note that in the service list data DS (FIG. 9), information of items such as "process name", "process type", "access destination address (e.g., URL)", "security level", "input format", "output format", "processing time", and "price" is recorded for each process. "Process name", "process type", "access destination address (e.g., URL)", and "security level" are information of the same content as the information with the same names in the aforementioned list LS. "Input format"

indicates a permitted format of input files in the process, and "output format" indicates a format of output files in the process. "Processing time" indicates the processing time (in other words, processing speed) per unit quantity (this unit quantity varies depending on the process type). For example, referring to the J-to-E translation processes PT, the average value of translation processing times per predetermined number of pages is recorded as "processing time". "Price" indicates the price per unit quantity (this unit quantity varies depending on the process type). For example, referring to the J-to-E translation processes PT, the average value of prices per predetermined number of pages is recorded as "price".

Here, if there are a plurality of candidates for the alternative process that have security levels higher than or equal to level LV3, the alternate-process selection unit 16 may select a specific process as the alternate process, based on yet another information (e.g., price information, processing-time information, or quality information). To be more specific, for example, a J-to-E translation process PT4 (see FIG. 9) with the shortest processing time may be selected as the alternate process from among a plurality of J-to-E translation processes having security levels higher than or equal to level LV3. Alternatively, the most inexpensive J-to-E translation process PT5 (see FIG. 9) may be selected as the alternate process from among the plurality of J-to-E translation processes having security levels higher than or equal to level LV3. Note that while quality information is not included in the service list data DS in FIG. 9, a configuration is also possible in a similar way in which, based on the service list data DS or the like that includes quality information, the highest-quality J-to-E translation process is selected as the alternate process from among the plurality of J-to-E translation processes having security levels higher than or equal to level LV3.

It is assumed here that the alternate-process selection unit 16 selects, as the alternate process, a process ("J-to-E translation process PT2") that has the same input format ("PDF") and the same output format ("PDF") as the original process ("J-to-E translation process PT1").

If it has been determined that there is no security problem with the registered task before change and an operation for changing to an alternate process is unnecessary, the user UA presses a button BN5. In response to the operation of pressing the button BN5, the MFP 1 executes the series of processes Pi (PN1, PR1, PT1, and PV1) registered as described above.

On the other hand, if there is a security problem with the registered task before change and the presented alternate process (the alternate process displayed below the button BN13 in the screen GA20b) is to be approved, the user UA presses a button BN6. In response to the operation of pressing the button BN6, the MFP 1 registers the "J-to-E translation process PT2" as the third process in the task in the task data DW in place of the "J-to-E translation process PT1". Then, the MFP 1 executes the changed series of processes Pi (PN1, PR1, PT2, and PV1).

Note that by pressing the button BN13, the user UA may manually determine (designate) an alternate process in the same manner as in the first embodiment.

According to the embodiment described above, an "alternate process" can be easily determined because it is automatically selected by the alternate-process selection unit 16.

In particular, the alternate process can be determined more appropriately, for example, in the case where there are a plurality of candidates for the alternate process and the selection of the alternate process is performed based additionally on other information such as price and/or processing time information.

3. Third Embodiment

While the above-described second embodiment takes the example of the case where a single process is replaced with another single process, the present invention is not limited to this. For example, a single process may be replaced with a plurality of other processes. A third embodiment describes such an aspect. The third embodiment is a variation of the second embodiment. The following description focuses on differences from the second embodiment.

Figure 18:
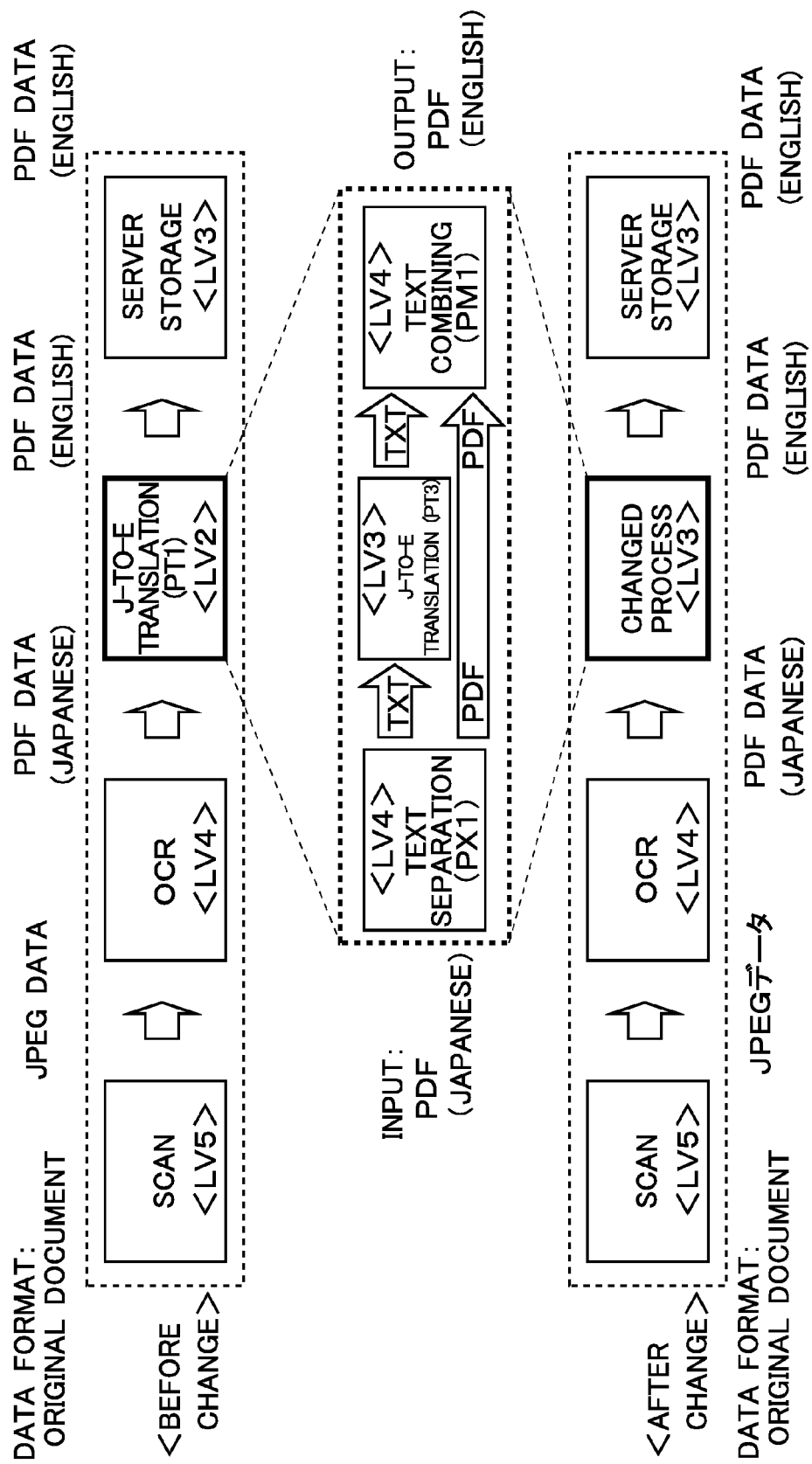
FIG. 18 is a conceptual diagram illustrating how processes are changed according to a third embodiment.

It is assumed in the third embodiment that the J-to-E translation process PT1 is replaced with a combination of three processes including a text separation process PX1, a J-to-E translation process PT3, and a text combining process PM1 as shown in FIG. 18. By combining the three processes including the text separation process PX1, the J-to-E translation process PT3, and the text combining process PM1, an equivalent function to the original lowest-level process (J-to-E translation process PT1) can be realized.

Specifically, the alternate-process selection unit 16 selects, as the alternative process, a process that is of the same type as the J-o-E translation process PT1 (lowest-level process) and has a security level higher than the security level (level LV2) of the lowest-level process, based on the service list data DS in FIG. 9. For example, assume that the alternate-process selection unit 16 selects the "J-to-E translation process PT3" having a security level "level LV3" as the alternate process. Here, note that the J-to-E translation processes PT2, PT4, and PT5 are not selected due to some circumstances (e.g., the services of the J-to-E translation process PT2 and the like are being stopped).

However, as shown in FIG. 9, the input format ("TXT") of the "J-to-E translation process PT3" is different from the input format ("PDF") of the "J-to-E translation process PT1". Furthermore, the output format ("TXT") of the "J-to-E translation process PT3" is also different from the output format ("PDF") of the "J-to-E translation process PT1".

Thus, the alternate-process selection unit 16 adds the "text separation process PX1" at a stage before the "J-to-E translation process PT3" and adds the "text combining process PM1" at a stage after the "J-to-E translation process PT3". The "text separation process PX1" is a process for separating text from original data (PDF data) and creating text data (pre-translation text data). The "text combining process PM1" is a process for creating new translated PDF data (PDF data translated into English), based on PDF data obtained by separating text in the text separation process (PDF data mainly including figures, pictures or the like) and text data that has undergone the J-to-E translation process PT3 (English text data obtained by translation).

Furthermore, the "text separation process PX1" has a security level (level LV4) higher than the security level (level LV2) of the original lowest-level process. The same applies to the "text combining process PM1".

In this way, the combination of the three processes including the text separation process PX1, the J-to-E translation process PT3, and the text combining process PM1 is determined as the alternate process that replaces the J-to-E translation process PT1 as shown in FIG. 18. In other words, two or more processes (PX1, PT3, PM1) that realize an equivalent function to the lowest-level process (J-to-E translation process PT1) and have security levels higher than the security level of the lowest-level process are selected as alternate processes.

With such an aspect, the same effects as in the second embodiment can be achieved.

In particular, the alternate-process selection unit 16 can perform selection of alternate processes from among a greater variety of alternate processes by including not only an alternate process that includes only a single process but also an alternate process that includes a plurality of processes (also referred to as an alternate process group) among processes to be selected.

To be more specific, in the above-described embodiment, a plurality of processes (PX1, PT3, and PM1) in which the format conversion processes PX1 and PM1 are added respectively before and after the process (J-to-E translation process PT3) of the same type as the process to be changed (J-to-E translation process PT1) are added as the candidate for the alternate process. Therefore, even a plurality of processes (PX1, PT3, and PM1) including such a process (J-to-E translation process PT3) that has different input and(/or) output formats from the pre-change J-to-E translation process PT1 can be selected as post-change processes (alternate processes). Accordingly, it is possible to expand the range of selection of the alternate process.

Note that while the third embodiment takes the example of the case where a single process PT1 is replaced with a plurality of other processes PX1, PT3, and PM1, the present invention is not limited to this. For example, a plurality of processes may be replaced with other plurality of processes.

Figure 19:
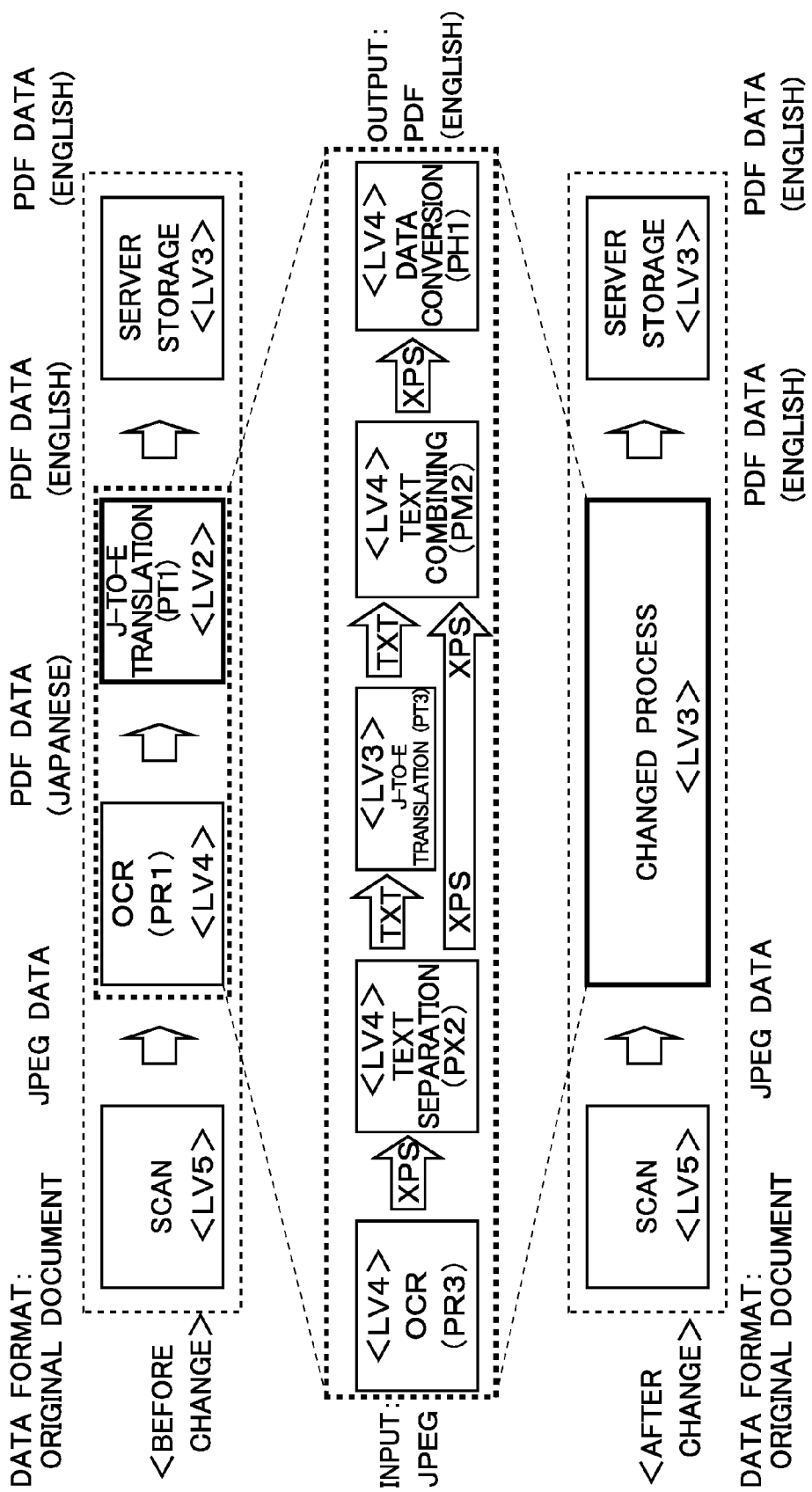
FIG. 19 is a conceptual diagram illustrating how processes are changed according to a modification of the third embodiment.

Specifically, as shown in FIG. 19, a combination of two processes including the OCR process PR1 and the J-to-E translation process PT1 may be replaced with a combination of five processes including an OCR process PR3, a text separation process PX2, the J-to-E translation process PT3, a text combining process PM2, and a data conversion process PH1.

Here, the OCR process PR3 is a process involving character recognition processing based on JPEG data, for replacing the JPEG data with data in the XML Paper Specification (XPS) format (also referred to as the "XPS data"). The "text separation process PX2" is a process for separating text from original data (XPS data) and creating text data (pre-translation text data) or the like. The "text combining process PM2" is a process for creating new translated XPS data (XPS data translated into English) based on XPS data obtained by separating text in the text separation process PX2 (XPS data mainly including figures, pictures or the like) and text data that has undergone the J-to-E translation process PT3 (English text data obtained by translation). The "data conversion process PH1" is a process for converting data from the XPS format to the PDF format.

Alternatively, as shown in FIG. 24, a combination of two processes including the OCR process PR1 and the J-to-E translation process PT1, may be replaced with a combination of two processes (the same number of processes) including an OCR process PR6 and a J-to-E translation process PT6. Here, the J-to-E translation process PT6 is a translation process for converting input data (Japanese data) in the XPS format into output data (English data) in the PDF format. The OCR process PR6 is an OCR process involving character recognition processing based on the JPEG data, for converting JPEG data into data in the XPS format. In this way, in the case where the original J-to-E translation process PT1 is replaced with another J-to-E translation process PT6, if the input data format (PDF format) of the original J-to-E translation process PT1 is different from the input data format (XPS format) of the post-replacement J-to-E translation process PT6, the process immediately before the J-to-E translation process PT1 to be replaced (specifically, OCR process PR1) may be replaced as well. Specifically, the OCR process PR1 for outputting data in the PDF format may be replaced with the OCR process PR6 for outputting data in the XPS format. As a result, the input data format (XPS format) of the post-replacement J-to-E translation process PT6 can be matched with the output data format (XPS format) of the post-replacement OCR process PR6 performed immediately before the J-to-E translation process PT6. With such an aspect, it is possible to resolve limitations placed due to a mismatch of the input format (input data format) and adopt the J-to-E translation process PT6 as a post-replacement process.

Furthermore, although the above-described embodiment, like the second embodiment, takes the example of the case where an alternate process is automatically selected by the MFP 1, the present invention is not limited to this. For example, alternate processes (e.g., PX1, PT3, and PM1) that replace an original process may be designated by the user UA in the same manner as in the first embodiment.

Furthermore, a configuration is also possible in which some alternate processes are designated by the user UA, and processes before and/or after the alternate processes are automatically replaced by the MFP 1 in order to resolve a mismatch of the input/output formats (input/output data formats) due to the use of the alternate processes.

For example, in the case (see FIG. 24) where an operation input by a user designates that the J-to-E translation process PT1 (in which input data is in the PDF format) is to be replaced with the J-to-E translation process PT6 (in which input data is in the XPS format), the OCR process that is the pre-process of the J-to-E translation process may be changed by the MFP 1. Specifically, the OCR process PR1 (in which output data is in the PDF format) may be changed to the OCR process PR6 (in which output data is in the XPS format). As a result, it is possible to resolve limitations placed due to a mismatch of the input format (input data format) and adopt the J-to-E translation process PT6 as a post-replacement process.

4. Fourth Embodiment

While the above-described embodiments take the example of the case where the same processes are performed on a document as a whole, the present invention is not limited to this. For example, different processes may be performed on a plurality of portions of a document. In particular, different processes may be performed on a plurality of portions having different required security levels. A fourth embodiment describes such an aspect. The fourth embodiment is a variation of the first embodiment. The following description focuses on differences from the first embodiment.

In the fourth embodiment, an operation for designating an alternate process is executed after a warning screen similar to the screen GA20 (FIG. 12) has been displayed on the touch screen 6c during the registration operation.

Specifically, first, when a detail editing button BU7 in the screen GA20 has been pressed by the user UA, a detail setting screen GA40 (not shown) is displayed on the touch screen 6c in response to the pressing operation.

Next, the user UA executes a division operation for dividing the document into two portions PA1 and PA2, using the detail setting screen GA40 or the like. Specifically, the user UA executes an input operation for designating page numbers of the first portion PA1 (e.g., "from page 1 to page 10") and page numbers of the second portion PA2 (e.g., "from page 11 to page 30"). It is assumed here that a relatively high value (e.g., level LV3) is set to the security level required for the first portion PA1, and a relatively low value (e.g., level LV2) is set to the security level required for the second portion PA2. In other words, the security level required for the second portion PA2 is lower than the security level required for the first portion PA1. Furthermore, the security level (LV2) of the original lowest-level process is a security level higher than or equal to the security level (LV2) required for the second portion PA2, but it is a security level lower than the security level (LV3) required for the first portion PAL Note that the user UA has acquired the security levels required for the portions PA1 and PA2 in advance.

Here, it can be said that in general, if the entire document is processed using alternate processes having higher security levels, the processing time will increase significantly. Thus, in consideration of these circumstances, the user UA causes the MFP 1 to execute different processes on the respective portions, with the intention of suppressing an increase in the processing time. Specifically, the user UA performs an operation for giving an instruction to perform different processes on the respective portions PA1 and PA2, using the detail setting screen GA40 or the like.

Figure 20:
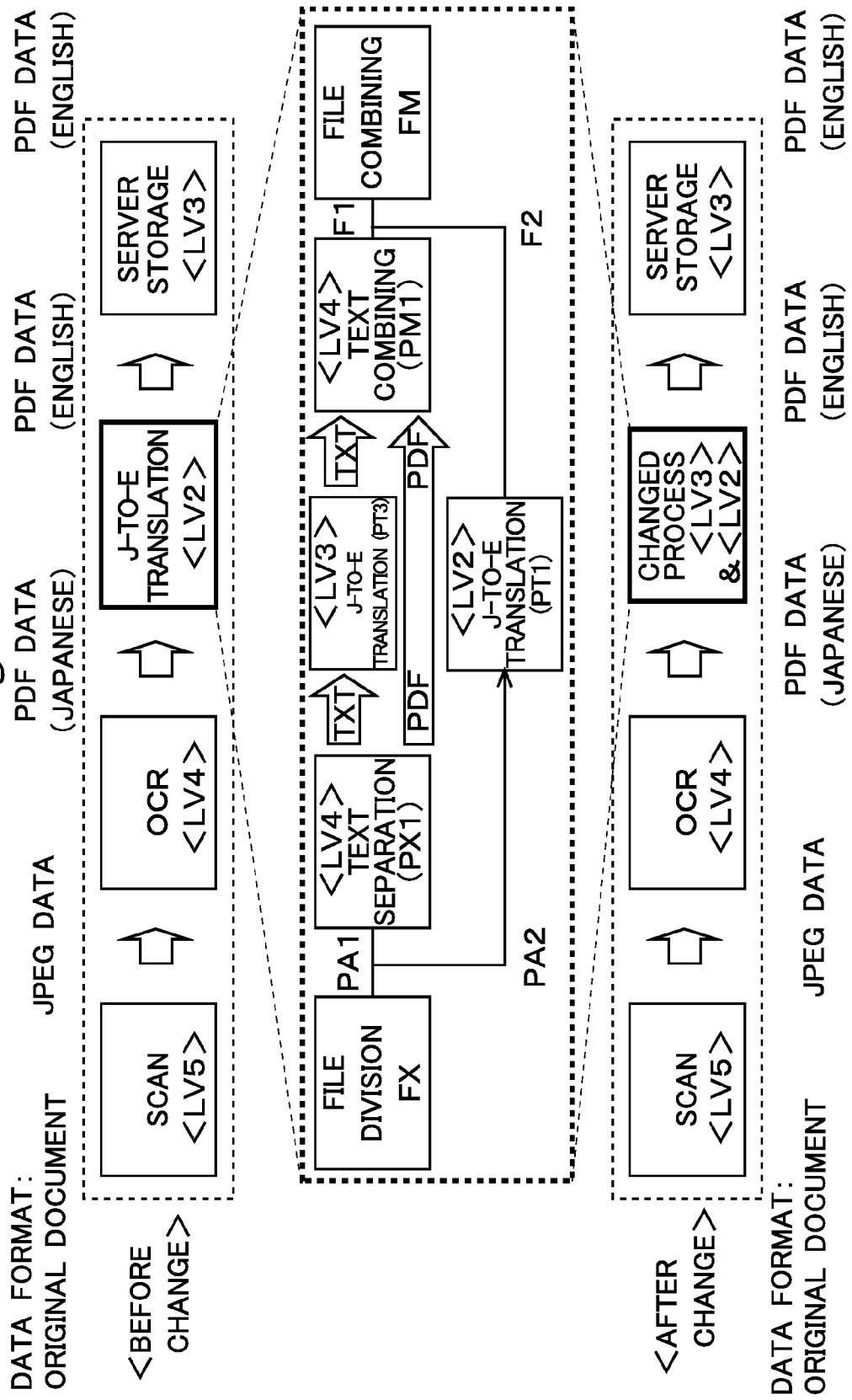
FIG. 20 is a conceptual diagram illustrating how processes are changed according to a fourth embodiment.

FIG. 20 shows alternate processes and the like according to the fourth embodiment.

The user UA determines that "the security level (LV2) of the original lowest-level process is lower than the security level (LV3) required for the first portion PA1 and is thus insufficient". Then, as shown in FIG. 20, the user UA designates that, for one portion PA1 among the two portions PA1 and PA2, alternate processes (PX1, PT3, and PM1) similar to those in the third embodiment be executed.

The user UA also determines that "the security level (LV2) of the original lowest-level process is higher than or equal to (in the present example, equal to) the security level (LV2) required for the other portion, namely, the second portion PA2, among the two portion PA1 and PA2, and thus it is unnecessary for the portion PA2 to change the lowest-level process. Then, the user UA designates that the original process PT1 be executed as-is for the portion PA2.

In response to these designation operations, for the portion PA1, the alternate-process selection unit 16 registers the alternate processes (PX1, PT3, and PM1) in the task data DW, and for the portion PA2, the alternate-process selection unit 16 determines the process PT1 that is different from the alternate processes as a process to be executed.

Based on these designation operations, the MFP 1 also adds a file division process FX as the initial process in the alternate process group and adds a file combining process FM as the last process in the alternate process group as shown in FIG. 20. The file division process FX is a process for dividing a PDF file generated by the scanning process PN1 and the OCR process PR1 into two portions PA1 and PA2. The file combining process FM is a process for combining a PDF file F1 generated by performing the alternate processes (PX1, PT3, and PM1) on the portion PA1, and a PDF file F2 generated by performing the original process PT1 on the portion PA2.

Through the above-described processing, it is possible to perform appropriate processes depending on the security levels required for the respective two portions PA1 and PA2.

5. Fifth Embodiment

A fifth embodiment is a variation of the second embodiment. The following description focuses on differences from the second embodiment.

The above-described second embodiment takes the example of the case where only the process PT1 having the lowest level LV2 is changed.

Figure 21:
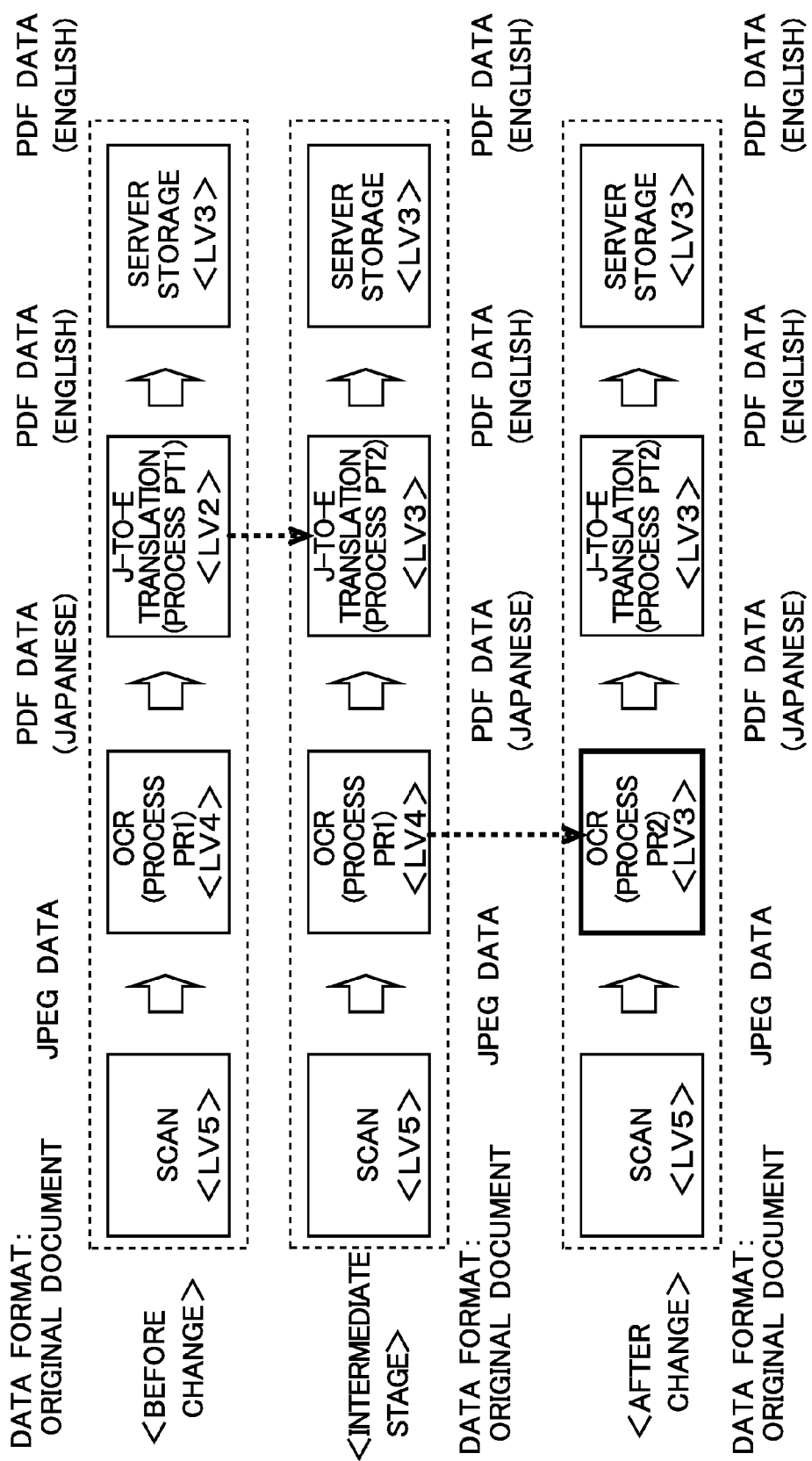
FIG. 21 is a conceptual diagram illustrating how processes are changed according to a fifth embodiment.

In the fifth embodiment, a case is described in which not only the J-to-E translation process PT1 having the lowest level LV2 but also the OCR process PR1 having a security level that is not the lowest level are changed as shown in FIG. 21. Specifically, the J-to-E translation process PT1 having the lowest level LV2 is first changed to the J-to-E translation process PT2 having a relatively higher security level LV3. Furthermore, the OCR process PR1 having a security level LV4 higher than the changed lowest level LV3 is changed to an OCR process PR2 having a relatively lower security level LV3 (security level LV3 higher than or equal to the changed lowest security level LV3). Note that FIG. 21 shows operations according to the fifth embodiment.

In the fifth embodiment, the screen GA20b in FIG. 17 is displayed in the same manner as in the second embodiment. Then, the user UA presses the button BN6 after confirmation. A state of change at this time (intermediate stage) is shown in the middle section of FIG. 21. Specifically, the J-to-E translation process PT1 has been changed to the J-to-E translation process PT2, as a result of which the security level of the third process has increased from "LV2" to "LV3". Following this, the security level of the entire task has also increased from "LV2" to "LV3".

Thereafter, the MFP 1 (e.g., the alternate-process selection unit 16) selects a process to be changed that is other than the lowest-level process, from among processes having security levels higher than the security level "LV3" of the entire task (in other words, the lowest security level LV3 in the task). It is assumed here that the alternate-process selection unit 16 selects the OCR process PR1 having a security level LV4 higher than the lowest security level LV3 as a process to be changed.

Furthermore, the alternate-process selection unit 16 selects a post-change process that is to be executed in place of the process to be changed (OCR process PR1), from among a plurality of processes of the same type (OCR processes). Specifically, the alternate-process selection unit 16 selects an OCR process having a security level higher than or equal to the lowest security level LV3 as a post-change process. For example, the alternate-process selection unit 16 selects the OCR process PR2 that is higher in speed than the OCR process PR1 as a post-change process, based additionally on the information regarding "processing time" in the service list data DS (FIG. 9). Following this, although the security level of the OCR process decreases from "level LV4" to "level LV3", the security level of the entire task remains unchanged at "level LV3" and does not drop.

Note that the present invention is not limited to this, and a post-change process (OCR process) may be selected based on other information. For example, an OCR process that is lower in price than the OCR process PR1 may be selected as a post-change process. Alternatively, an OCR process that is higher in quality than the OCR process PR1 (i.e., an OCR process having higher conversion accuracy) may be selected as a post-change process.

Then, the MFP 1 displays a screen GA20c (not shown) similar to that in FIG. 17 on the touch screen 6c. The screen GA20c includes the content prompting the user to confirm whether or not to change the OCR process PR1 to the OCR process PR2. When the user UA performs an operation for approving that change, the content of the change is finalized. Then, the MFP 1 executes the changed series of processes (PN1, PR2, PT2, and PV1).

As a result of the operations as described above, the OCR process PR1 having a security level LV4 higher than the lowest security level LV3 has been selected as a process to be changed, and has been changed to a process having a security level higher than or equal to the lowest security level LV3 (OCR process PR2). Accordingly, it is also possible to change a process having an unnecessarily high security level (OCR process PR1) to another process (OCR process PR2) based on information regarding items other than the security level (e.g., price information, processing time information, or quality information). In this way, the security levels of a plurality of processes that constitute a task can be adjusted in consideration of the balance among the security levels of these processes.

Note that although the case where the OCR process PR1 is changed to another OCR process PR2 is illustrated here, the present invention is not limited to this, and other processes may be changed instead. For example, the scanning process PN1 having a security level LV5 may be changed to another scanning process having a security level LV4.

6. Sixth Embodiment

While the above-described embodiments take the example of the case where information regarding the "lowest-level process" is notified to the user UA, the present invention is not limited to this. For example, information regarding a process having a security level lower than a predetermined reference level (also referred to as the "low-level security process") may be notified to the user UA. Specifically, in the case where it has been detected that a process having a security level lower than the security level required for a document targeted for the task (reference level of the document) (i.e., "low-level security process") is included in the registered task data DW, that fact may be notified to the user UA. A sixth embodiment describes such an aspect.

The sixth embodiment is a variation of the first embodiment, and the following description focuses on differences from the first embodiment.

An MFP 1 (also referred to as the "MFP 1F") according to the sixth embodiment specifies a "low-level security process" instead of specifying the lowest-level process in step S12 in FIG. 11. Specifically, the MFP 1 specifies a process ("low-level security process") having a security level lower than the security level required for a document targeted for the task (reference level of the document), based on the registered task data DW. For example, if the security level required for a document is "LV3", the J-to-E translation process PT1 having a security level LV2 is specified as the "low-level security process".

Note that the security level required for a document may, for example, be set (designated and input) in advance by the user UA at a time of starting a task registration operation or the like (at a time before step S12) and acquired by the MFP 1. Alternatively, the MFP 1 may acquire the security level required for a target document by tentatively scanning only the first page of the document at a time of starting a task registration operation or the like. To be more specific, the MFP 1 may detect information described in a document (e.g., characters such as "confidential information" or characters such as "Document security level 4") by performing character recognition processing on a scan image obtained by tentative scanning, and then determine the security level required for the document.

Figure 22:
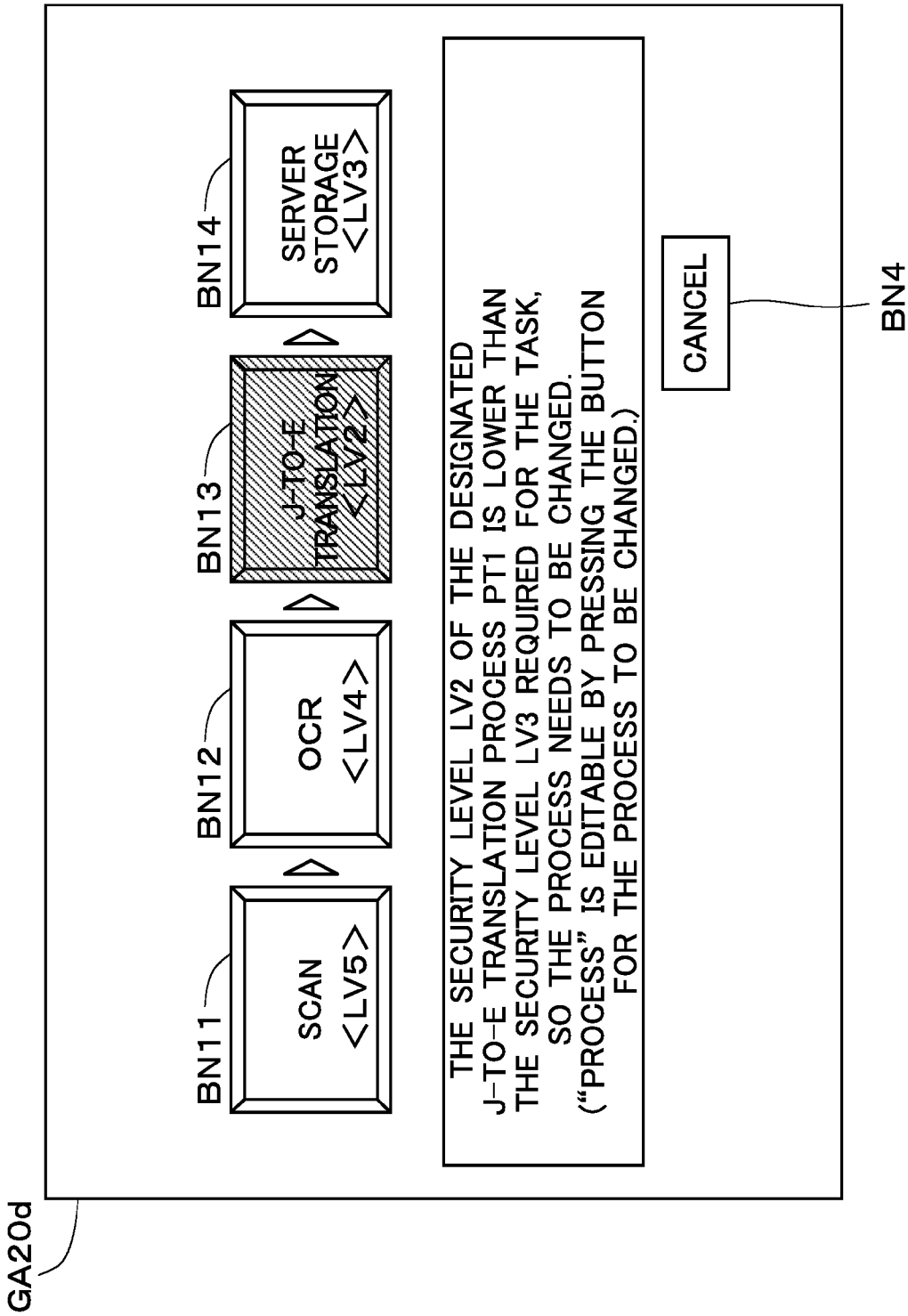
FIG. 22 shows a notification screen according to a sixth embodiment.

Following this, in step S13, information regarding the "low-level security process" is notified to the user UA. For example, a notification screen GA20d as shown in FIG. 22 is used. The notification screen GA20d is a screen similar to the notification screen GA20a in FIG. 12. However, the notification screen GA20d shows a character string such as "The security level LV2 of the designated J-to-E translation process PT1 is lower than the security level LV3 required for the task, so the process needs to be changed. ("Process" is editable by pressing the button for the process to be changed)".

After checking the screen GA20d, the user UA presses the button BN13 or the like and executes an operation for changing the process in the same manner as in the first embodiment. As a result, a post-change process is appropriately designated. For example, the J-to-E translation process PT2 is designated as an alternate process. Then, a series of processes including the post-change process is executed.

As a result of the operations as described above, a "low-security-level process" in the task is specified, and information regarding the low-security-level process (e.g., information including process name and security level) is notified to a user. Therefore, the user can easily confirm whether or not the security levels of the processes in the task satisfy a predetermined reference. Accordingly, security can be ensured more appropriately when executing a plurality of processes.

7. Variations

While the above has been descriptions of embodiments of the present invention, the present invention is not intended to be limited to those described above.

For example, while the above-described embodiments take the example of the case where the operation for registering a task is executed before execution of the scanning process, the present invention is not limited to this, and a configuration is possible in which the scanning process is executed first and then the operation for registering the other processes in the task is executed.

Furthermore, while the above-described embodiments mainly take the example of the case where the four processes (jobs) including the scanning process, the OCR process, the translation process, and the server storage process are executed in the order specified, the present invention is not limited to this, and the present invention is also applicable to other processes. For example, the above-described idea is also applicable to a plurality of processes including, for example, a process for acquiring a document data file from web storage, a process for translating the document data file from Japanese to English using translation services, and a process for printing out the translated document data file.

Furthermore, the idea of the above-described sixth embodiment is applicable to not only the first embodiment but also the other embodiments and the like.

Specifically, in the second embodiment, if it has been determined that a process having a security level lower than the security level required for a document ("low-security-level process") is included in the registered task data DW, that fact may be notified to the user UA.

Then, the MFP 1 may perform an operation for selecting an alternate process that replaces the "low-security-level process" in place of the operation for selecting an alternate process that replaces the "lowest-level process". This differs from the above-described second embodiment in that the process to be changed is the "low-security-level process" instead of the "lowest-level process", but is the same in the other respects.

Figure 23:
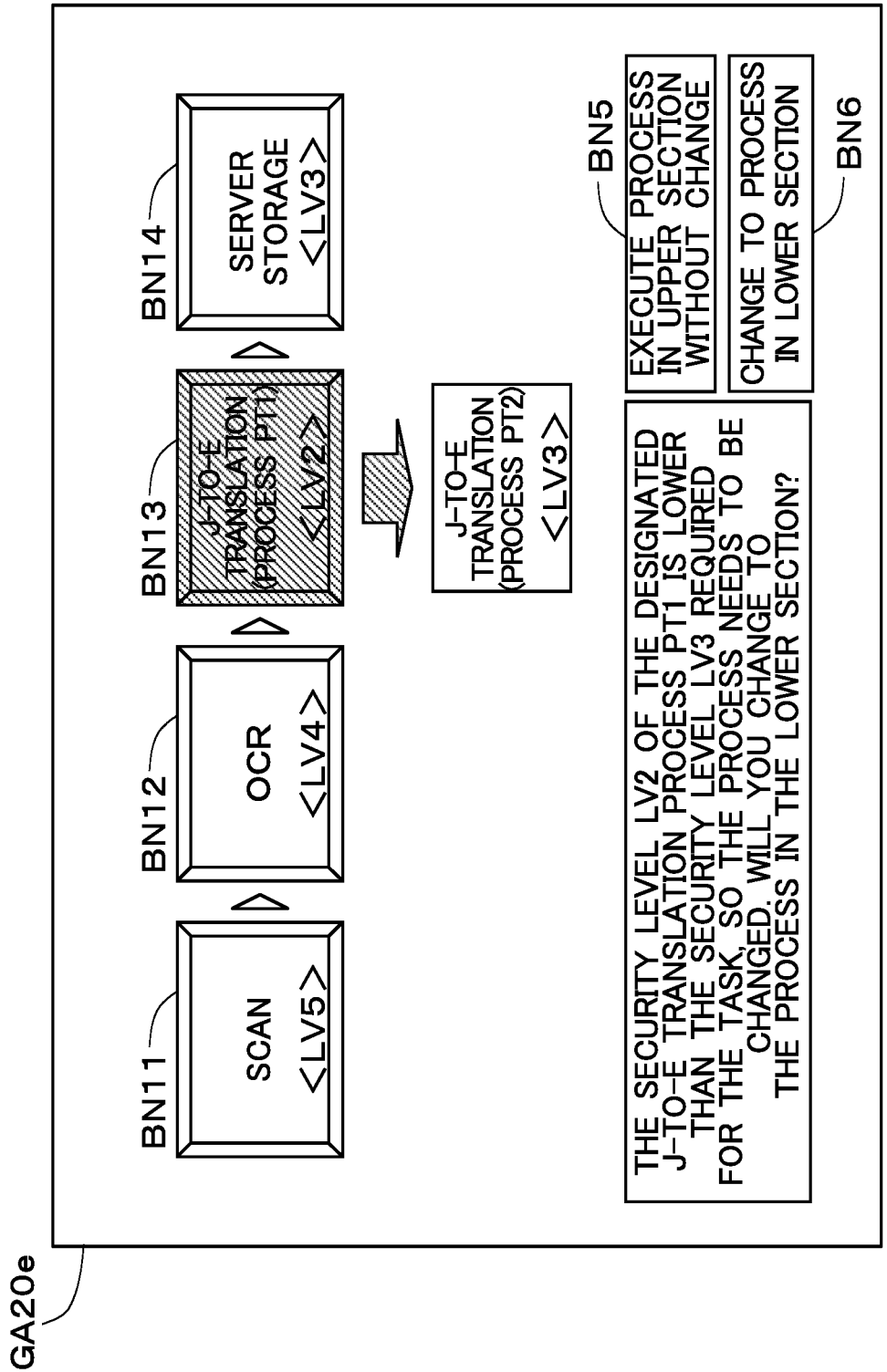
FIG. 23 shows a notification screen according to a modification.

FIG. 23 shows a notification screen GA20e according to such a modification. Using the screen GA20e as shown in FIG. 23, information regarding the J-to-E translation process PT1 as the "low-security-level process" (process name and security level LV2) may be notified, and the J-to-E translation process PT2 having a security level LV3 may be notified as the alternate process that replaces the J-to-E translation process PT1.

Similar modifications can be made to the other third to fifth embodiments and the like.

Furthermore, while the fourth embodiment takes the example of the case where the user UA designates information regarding division of a document (section information), the present invention is not limited to this, and the MFP 1 may determine positions at which a document is divided. Furthermore, a configuration is also possible in which the MFP 1 determines a process to be performed on each divided portion. Note that such a modification is also applicable to both the cases where a "lowest-level process" is notified and where a "low-security-level process" is notified. The following describes an example in which the modification is applied to the case where a "low-security-level process" is notified.

For example, consider the case where an operation for registering a plurality of processes other than a scanning process is executed after execution of the scanning process. In this case, the MFP 1 reads security-level information of each page through character recognition processing or the like when executing the scanning process, and then sections the document into two portions PA1 and PA2 based on the security-level information of each page. It is assumed here that the MFP 1 acquires the security levels required for the portions PA1 and PA2 at a given time during the registration operation (at a time before step S12), using the technique described in the sixth embodiment or the like.

Thereafter, a task registration operation for registering a plurality of processes other than the scanning process is performed, and the MFP 1 executes the operation of step S11 onward and determine appropriate processes for the respective portions PA1 and PA2 based on the security levels required for these portions Specifically, in step S12, the specification unit 14 compares the security level LV3 required for the portion PA1 with each of the security levels of a plurality of processes PN1, PR1, PT1, and PV1, and detects a "low-security-level process". Specifically, the J-to-E translation process PT1 having a security level LV2 is specified as a "low-security-level process" for the portion PA1.

Furthermore, the specification unit 14 compares the security level LV2 required for the portion PA2 with each of the security levels of the plurality of processes PN1, PR1, PT1, and PV1, and detects a "low-security-level process". Since the security levels of the processes PN1, PR1, PT1, and PV1 are all higher than or equal to the security level LV2 required for the portion PA2, a "low-security-level process" for the portion PA2 is not detected.

Furthermore, in step S13, not only the notification process but also an operation for selecting an alternate process and the like are executed. Specifically, the alternate-process selection unit 16 selects an alternate process that replaces the J-to-E translation process PT1 to be performed on the portion PA1, based on the service list data DS (FIG. 9). Specifically, a process that is of the same type (J-to-E translation process) as the J-to-E translation process PT1 ("low-security-level process") and has a security level higher than or equal to the security level LV3 required for the portion PA1 is selected as an alternate process. For example, a combination of three processes PX1, PT3, and PM1 is selected as alternate processes (alternate process group) in the same manner as in the fourth embodiment (see FIG. 20). Alternatively, the J-to-E translation process PT4 having a security level LV4 or the like may be selected as an alternate process.

Furthermore, the alternate-process selection unit 16 adds the file division process FX (described above) as the initial process in the alternate process group, and adds the file combining process FM (described above) as the last process in the alternate process group (see FIG. 20).

Then, the MFP 1 displays a screen for confirming the content of the change on the touch screen 6c, and after an approval operation performed by the user UA, executes the changed series of processes. However, as described above, with respect to some of the plurality of processes, different processes are executed on the portions PA1 and PA2 of the document.

As described above, with such a modification, it is possible to achieve the same effects as in the sixth embodiment and to perform appropriate processes on the two portions PA1 and PA2 depending on the security levels required for the respective portions.

Alternatively, both the operation for detecting a lowest-level process and the operation for detecting a low-security-level process may be executed. Specifically, in the first embodiment, the notification to the user UA in step S13 may be performed on condition that the security level of the lowest-level process detected in step S12 be lower than the security level required for a target document. In this case, the user UA is notified of the fact that the lowest-level process does not satisfy a predetermined criterion, and therefore the user UA can take an appropriate measure depending on the notification. In particular, in the case where the security level of the lowest-level process detected in step S12 is higher than or equal to the security level required for a target document, no notification is given to the user UA. This enables excessive notification to the user to be suppressed. Note that similar modifications can be made to the second to fourth embodiments and the like.

Furthermore, while the above-described fourth embodiment takes the example of the case where an alternate process is determined by the designation operation by the user in the same manner as in the first embodiment, the present invention is not limited to this. For example, for the portion PA1, an alternative process may be selected by the alternate-process selection unit 16 based on the service list data DS in the same manner as in the second embodiment. For the portion PA2, an alternate process may be determined by the designation operation by the user in the same manner as in the first embodiment. However, the present invention is not limited to this, and an alternate process for the portion PA2 may also be selected by the alternate-process selection unit 16 based on the service list data DS in the same manner as in the second embodiment.

In particular, in the case where information regarding the security levels required for the respective portions PA1 and PA2 are acquired by the MFP 1 using various techniques (described above) such as input by the user UA, the alternate-process selection unit 16 may determine an alternate process that replaces the "lowest-level process" or the like for each portion based on the acquired information. Specifically, a configuration is possible in which the security level of the "lowest-level process" is compared with the security levels required for the respective portions PA1 and PA2, and an alternate process is determined for only a portion having a required security level higher than the security level of the "lowest-level process", among the plurality of portions PA1 and PA2. On the other hand, for a portion having a required security level lower than or equal to the security level of the "lowest-level process", the original lowest-level process may be determined as-is as a process to be executed. For example, since the security level LV3 required for the portion PA1 is higher than the security level LV2 of the "lowest-level process", the alternate-process selection unit 16 may determine that alternate processes (PX1, PT3, and PM1) similar to those in the third embodiment are to be executed for the portion PA1. Furthermore, since the security level LV2 required for the portion PA2 is the same as the security level LV2 of the "lowest-level process", the alternate-process selection unit 16 may determine the original process PT1 as-is as a process to be executed for the portion PA2.

Furthermore, the task data DW in the above-described embodiments may be registered within the MFP 1, or may be registered in a device (e.g., a file server) outside the MFP 1. For example, the MFP 1 may acquire the registered task data (task data of the registered task) from an external device (e.g., a file server) via the network NW in response to user operations or the like. Then, the MFP 1 may specify a plurality of processes included in the registered task based on the task data and acquire the security levels of the plurality of processes.

Furthermore, while the above-described first to fourth embodiments take the example of the case where the process name, security level, and the like of the "lowest-level process" are notified, the present invention is not limited to this. For example, processing speed information, price information and/or quality information regarding the "lowest-level process" or the like may be additionally notified (provided) to a user. To be more specific, "processing time" information (processing speed information) regarding the original lowest-level process and "processing time" information (processing speed information) regarding an alternate process may be displayed in the notification screen GA20. With such a modification, it is possible to determine an alternate process in additional consideration of various elements other than the security level. Furthermore, similar modifications can also be made to the notification regarding a "low-security-level process".

Furthermore, while the above-described embodiments give the MFPs as examples of the image forming apparatus, the present invention is not limited to this, and the image forming apparatus may be configured as, for example, a single-function printer, a copier, or a scanner.

Furthermore, the above-described idea may be adopted into an image processing system constituted by a scanner, a computer and the like.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An image processing apparatus capable of executing a task on a document, the task including a plurality of processes, comprising:
    an acquisition unit that acquires a security level for each of the plurality of processes based on security-level information that defines a security level of each process;
    a specification unit that specifies a lowest-level process that is a process having a lowest security level, from among the plurality of processes;
    a selection unit that selects an alternate process, having a security level different than the lowest-level process, that is to be executed in place of the lowest-level process, based on the security-level information; and
    a notification unit that notifies a user of information regarding the lowest-level process;
    wherein for a first portion of the document having a first required security level among a plurality of portions of the document targeted for the task, the selection unit selects the alternate process, and for a second portion of the document having a second required security level that is different from the first required security level, the selection unit determines a process that is different from the alternate process as a process to be executed, wherein the first portion is different than the second portion.

2. The image processing apparatus according to claim 1, wherein
    the selection unit selects, as the alternate process, a process that is of the same type as the lowest-level process and has a security level higher than a security level of the lowest-level process.

3. The image processing apparatus according to claim 1, wherein
    the selection unit selects, as the alternate process, two or more processes that realize an equivalent function to the lowest-level process and have security levels higher than a security level of the lowest-level process.

4. The image processing apparatus according to claim 1, wherein
    the selection unit selects the alternate process that replaces the lowest-level process, based on at least one of processing speed information, price information, and quality information regarding each process.

5. The image processing apparatus according to claim 1, wherein
    the selection unit selects, from among the plurality of processes, a post-change process that is to be executed in place of a process to be changed that is a process other than the lowest-level process, based on at least one of processing speed information, price information, and quality information regarding each process.

6. The image processing apparatus according to claim 1, further comprising:
    an accepting unit that accepts an input of designating an alternate process that replaces the lowest-level process.

7. The image processing apparatus according to claim 1, wherein
    the notification unit notifies the user of at least one of processing speed information, price information, and quality information regarding each process.

8. The image processing apparatus according to claim 1, wherein
    the notification unit notifies a security level of the lowest-level process.

9. The image processing apparatus according to claim 1, wherein
    the notification unit notifies the user of the information regarding the lowest-level process on condition that a security level of the lowest-level process be lower than a reference level of a document targeted for the task.

10. An image processing system capable of executing a task on a document, the task including a plurality of processes, comprising:
    an acquisition unit that acquires a security level for each of the plurality of processes based on security-level information that defines a security level of each process;
    a specification unit that specifies a lowest-level process that is a process having a lowest security level, from among the plurality of processes;
    a selection unit that selects an alternate process, having a security level different than the lowest-level process, that is to be executed in place of the lowest-level process, based on the security-level information; and
    a notification unit that notifies a user of information regarding the lowest-level process;

wherein for a first portion of the document having a first required security level among a plurality of portions of the document targeted for the task, the selection unit selects the alternate process, and for a second portion of the document having a second required security level that is different from the first required security level, the selection unit determines a process that is different from the alternate process as a process to be executed, wherein the first portion is different than the second portion.

11. A non-transitory computer-readable recording medium storing a program for causing a computer to execute the steps of:
   a) acquiring a security level for each of a plurality of processes that constitute a predetermined task, based on security-level information that defines a security level of each process;
   b) specifying a lowest-level process that is a process having a lowest security level, from among the plurality of processes;
   c) selecting an alternate process, having a security level different than the lowest-level process, that is to be executed in place of the lowest-level process, based on the security-level information; and
   d) notifying a user of information regarding the lowest-level process;
   e) wherein for a first portion of the document having a first required security level among a plurality of portions of the document targeted for the task, the selecting includes selecting the alternate process, and for a second portion of the document having a second required security level that is different from the first required security level, the selecting includes determining a process that is different from the alternate process as a process to be executed, wherein the first portion is different than the second portion.

12. An image processing apparatus capable of executing a task on a document, the task including a plurality of processes, comprising:
   an acquisition unit that acquires a security level for each of the plurality of processes based on security-level information that defines a security level of each process;
   a specification unit that specifies a low-security-level process that is a process having a security level lower than a reference level of a document targeted for the task, from among the plurality of processes;
   a selection unit that selects an alternate process that is to be executed in place of the low-security-level process, based on the security-level information; and
   a notification unit that notifies a user of information regarding the low-security-level process;
   wherein for a first portion of the document having a first required security level among a plurality of portions of the document targeted for the task, the selection unit selects the alternate process, and for a second portion of the document having a second required security level that is different from the first required security level, the selection unit determines a process that is different from the alternate process as a process to be executed, wherein the first portion is different than the second portion.

13. The image processing apparatus according to claim 12, wherein
   the selection unit selects, as the alternate process, a process that is of the same type as the low-security-level process and has a security level higher than a security level of the low-security-level process.

14. The image processing apparatus according to claim 12, wherein
   the selection unit selects, as the alternate process, two or more processes that realize an equivalent function to the low-security-level process and have security levels higher than a security level of the low-security-level process.

15. The image processing apparatus according to claim 12, wherein
   for a first portion having a first required security level among a plurality of portions of the document targeted for the task, the selection unit selects the alternate process, and for a second portion having a second required security level that is different from the first required security level, the selection unit determines a process that is different from the alternate process as a process to be executed.

16. An image processing system capable of executing a task including a plurality of processes, comprising:
   an acquisition unit that acquires a security level for each of the plurality of processes based on security-level information that defines a security level of each process;
   a specification unit that specifies a low-security-level process that is a process having a security level lower than a reference level of a document targeted for the task, from among the plurality of processes;
   a selection unit that selects an alternate process that is to be executed in place of the low-security-level process, based on the security-level information; and
   a notification unit that notifies a user of information regarding the low-security-level process;
   wherein for a first portion of the document having a first required security level among a plurality of portions of the document targeted for the task, the selection unit selects the alternate process, and for a second portion of the document having a second required security level that is different from the first required security level, the selection unit determines a process that is different from the alternate process as a process to be executed, wherein the first portion is different than the second portion.

17. A non-transitory computer-readable recording medium storing a program for causing a computer to execute the steps of:
   a) acquiring a security level for each of a plurality of processes that constitute a predetermined task, based on security-level information that defines a security level of each process;
   b) specifying a lowest-level process that is a process having a lowest security level, from among the plurality of processes;
   c) selecting an alternate process, having a security level higher than the lowest-level process, that is to be executed in place of the lowest-level process, based on the security-level information; and
   d) notifying a user of information regarding the lowest-level process;
   e) wherein for a first portion of the document having a first required security level among a plurality of portions of the document targeted for the task, the selecting includes selecting the alternate process, and for a second portion of the document having a second required security level that is lower than the first required security level, the selecting includes determining a process that is different from the alternate process as a process to be executed, wherein the first portion is different than the second portion.

18. The image processing apparatus according to claim 1, wherein the alternate process has a higher security level than the lowest security level.

19. The image processing apparatus according to claim 18, wherein the first required security level is higher than the second required security level, and the selection unit selects the process having a lower security level than the security level of the alternate process for the second portion.

20. The image processing apparatus according to claim 19, wherein the selection unit selects the process having the lowest security level for the second portion.

21. The image processing apparatus according to claim 12, wherein the alternate process has a higher security level than the lowest security level.

22. The image processing apparatus according to claim 21, wherein the first required security level is higher than the second required security level, and the selection unit selects the process having a lower security level than the security level of the alternate process for the second portion.

23. The image processing apparatus according to claim 22, wherein the selection unit selects the process having the lowest security level for the second portion.

* * * * *